US012275497B2

(12) United States Patent
Miskin et al.

(10) Patent No.: US 12,275,497 B2
(45) Date of Patent: Apr. 15, 2025

(54) WATER FLOATATION DEVICE AND FLOATING AUDIO DEVICES

(71) Applicants: Mike Miskin, Sleepy Hollow, IL (US); Charles F. Huber, Lake Forest, IL (US)

(72) Inventors: Mike Miskin, Sleepy Hollow, IL (US); Charles F. Huber, Lake Forest, IL (US)

(73) Assignee: Sandbutt LLC, Sleepy Hollow, IL (US)

(*) Notice: Subject to any disclaimer, the term of this patent is extended or adjusted under 35 U.S.C. 154(b) by 0 days.

(21) Appl. No.: 18/226,696

(22) Filed: Jul. 26, 2023

(65) Prior Publication Data

US 2024/0391560 A1 Nov. 28, 2024

Related U.S. Application Data

(60) Provisional application No. 63/523,833, filed on Jun. 28, 2023, provisional application No. 63/470,055, filed on May 31, 2023, provisional application No. 63/503,875, filed on May 23, 2023.

(51) Int. Cl.

| | |
|---|---|
| ***A45C 3/10*** | (2006.01) |
| ***B63B 22/22*** | (2006.01) |
| ***B65D 81/38*** | (2006.01) |
| ***H04R 1/02*** | (2006.01) |

(52) U.S. Cl.

CPC .......... *B63B 22/22* (2013.01); *B65D 81/3888* (2013.01); *H04R 1/026* (2013.01)

(58) Field of Classification Search

CPC ......... B63B 22/22; B63B 21/24; B63B 35/00; B63B 34/50; B63B 34/52; B65D 81/3888; H05R 1/026; A47G 2200/02

USPC ......................... 220/560; 441/129, 40, 41, 42

See application file for complete search history.

(56) References Cited

U.S. PATENT DOCUMENTS

| | | | | |
|---|---|---|---|---|
| 5,551,901 A * | 9/1996 | Jaeger | B63B 22/16 441/6 |
| 6,659,822 B1 * | 12/2003 | Dombeck | B63B 35/58 441/35 |
| 8,756,856 B1 * | 6/2014 | Girvin | A01K 97/20 220/560 |

(Continued)

FOREIGN PATENT DOCUMENTS

| | | | | |
|---|---|---|---|---|
| TW | M243437 | * 9/2004 | A45C 3/10 |

*Primary Examiner* — Don M Anderson
*Assistant Examiner* — Elizabeth J Volz
(74) *Attorney, Agent, or Firm* — K&L Gates LLP

(57) ABSTRACT

A water flotation device and floating audio devices are disclosed herein. In an example, a flotation apparatus for supporting a portable audio device on water includes an inflatable flotation device including at least one compartment configured to securely contain an audio device. The at least one compartment is configured to enable the audio device to be inserted and removed from the at least one compartment. The flotation apparatus also includes at least one air valve configured for inflating and deflating the inflatable flotation device and at least one connection point. The at least one connection point is configured to connect to at least one line that is configured to be connected to at least one anchor. The inflatable flotation device is configured to float on a surface of a body of water and securely contain the audio device in the at least one compartment.

48 Claims, 19 Drawing Sheets

(56) References Cited

U.S. PATENT DOCUMENTS

| | | | | |
|---|---|---|---|---|
| 2004/0166749 | A1* | 8/2004 | Le Gette | B63B 7/08<br>441/66 |
| 2010/0297899 | A1* | 11/2010 | Lin | B63B 34/52<br>381/393 |

* cited by examiner

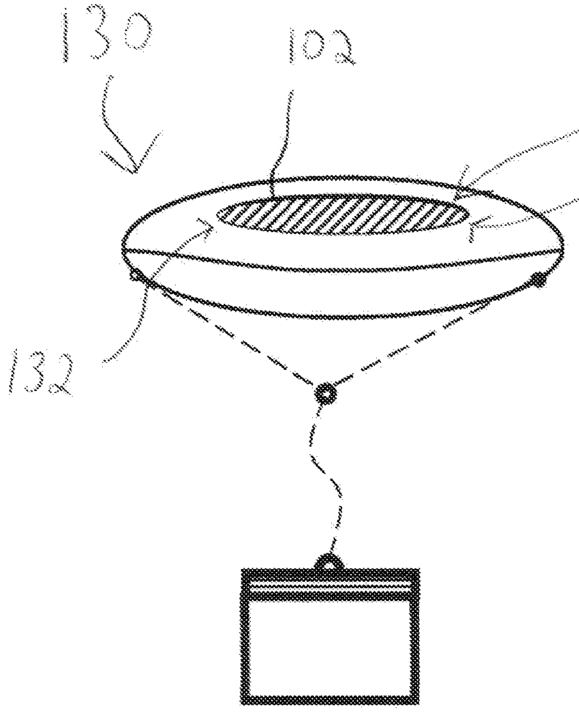
Figure 4.A
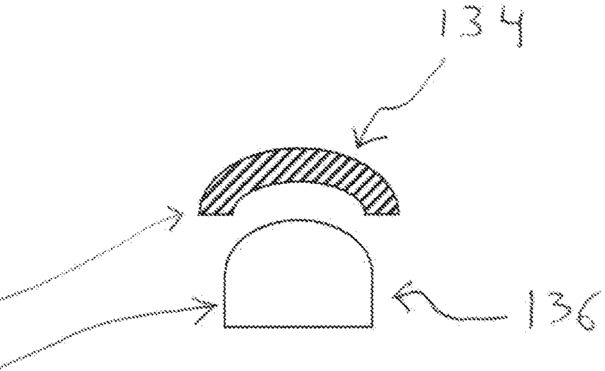
Figure 4.B
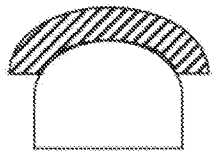
Figure 4.C

WATER FLOATATION DEVICE AND FLOATING AUDIO DEVICES

PRIORITY CLAIM

This application claims priority to and the benefit as a non-provisional application of U.S. Provisional Patent Application No. 63/503,875, filed May 23, 2023, U.S. Provisional Patent Application No. 63/470,055, filed May 31, 2023, and U.S. Provisional Patent Application No. 63/523,833, filed Jun. 28, 2023, the entire contents of which are hereby incorporated by reference and relied upon.

TECHNICAL FIELD

The disclosure generally relates to pool, beach, and/or swimming accessories. More specifically, the disclosure relates to a) floating audio systems such as radios and/or wireless speakers having a securing location and/or compartment for at least one communication device and optionally an anchor to keep the floating audio systems in a stationary location when used in a body of water, and b) flotation devices comprising at least one securing location and/or compartment for housing a user's portable audio systems such as radios, wireless speakers, communication devices and other consumer electronics while in the water.

BACKGROUND

Wireless speakers have become increasingly popular over portable radios in recent years as consumers seek more convenient and versatile ways to enjoy streaming their music and other audio content. Traditional wired speakers require a physical connection to an audio source, which can be cumbersome and limiting. In contrast, wireless speakers are battery operated, often with rechargeable batteries, and use wireless communication technology such as Bluetooth® or Wi-Fi™ to connect to a source device without the need for wires, thereby offering greater flexibility and ease of use.

Wireless speakers have many applications, from home entertainment systems to portable speakers for outdoor use. They offer a range of features such as high-quality sound, portability, and smart home integration. Some wireless speakers even incorporate voice assistants like Amazon® Alexa or Google® Assistant, enabling users to control their music or access other features hands-free. Wireless speakers have also become very popular for people to take to the pool and/or beach.

Wireless speakers for use at the beach, pool, or other water related activities have become more popular, requiring wireless speakers to be designed to be water resistant or waterproof. Some wireless speakers have International Protection or Ingress Protection ("IP") ratings for water such as IP66, IP67, IPX5, or other ratings. The ratings indicate how much protection any given product has against exposure to solids and liquids. For example, wireless speakers or smartphones with an IP68 rating are rated as being waterproof such that these wireless speakers and/or smartphones can accept heavy sprays of water or even be submerged, but only for a short period of time. Additionally, this submersion should not be something that occurs often with the same wireless speaker and/or smartphone as it will compromise the life of the product. Even with the best waterproof rating, it is recommended to keep wireless speakers, smartphones, and most other consumer electronics dry and away from water where they may get wet or be submerged.

Some known wireless speakers are designed to float in swimming pools. These speakers are often made of a durable plastic, rubber, and other components including but not limited to electronic components needed to make the speaker. These floating speakers also require a wireless connection to a smartphone or Wi-Fi network. Generally a smartphone is kept poolside and nearby to establish a connection and control the audio streaming to these floating speakers in the pool. Current floating pool speakers lack a storage location that provides the ability to safely secure in place and/or contain and protect smartphones or other consumer electronic devices that often must be in wireless communication and/or connectivity with the floating pool speaker to stream audio. The smartphone or other device must be placed at a remote location and protected from the water and is therefore separated from this type of floating speaker. These existing known speakers also lack the ability to be stationary and stay in one place as water movement occurs and/or increases near the speaker from people moving in the pool. Due to moving water, these types of floating speakers often end up in a corner of the pool, in skimmers, or against the side of the pool. As water movement increases near the floating wireless speaker, the speaker moves to other locations. If a person wanted these known floating speakers to stay near them, they would be required to hold the speakers in place. If a person were to attempt using this type of speaker in the water at a beach where there are inbound waves or outbound water currents, the speaker would be pushed to shore or out to deeper waters away from the person unless the person was holding it in place while in the water, which is not a convenient solution. This type of floating pool speaker would potentially be lost if pulled out to sea or deep lake water if not held in place.

Additionally, if a person was even willing to take such a floating speaker out into a lake or ocean and hold it in place, they would also need to take a smartphone, tablet, and/or other consumer electronic device with them into the lake or ocean to be near the speaker. Alternatively, the smartphone, tablet, and/or other consumer electronic device would have to stay within short-range proximity to shore. For example, these devices would have to be within approximately 33 feet (the typical range of a Bluetooth® wireless speaker at 2.5 milliwatts). Wi-Fi™ is generally not available at a beach as you get out into the water away from shore. Wireless speakers connected to smartphones are much more common at the beach but the speakers are left near beach chairs, near towels, or other areas where people congregate on land.

Despite their popularity of being used at the pool, lake, or beach, water resistant and/or waterproof radios and/or wireless speakers have not been designed to float in or on water with the exception of the pool speaker. The problem with known floating pool speakers is that they are not anchored in any way and lack the ability to stay in a reasonably stationary location when and where there is moving water. These known floating speakers have been designed to be contained in pool and/or enclosed body of water and are not designed for use in an open body of water such as the ocean, a lake, or a river as they do not stay in a stationary location. There exists a need for floating radios floating speakers (audio device), and/or flotation devices for audio devices, having an anchoring device and/or system (anchor) to enable a person to take the audio device into a moving body of water such as a river, a lakes or an ocean and keep the audio device in a reasonably stationary location near a person without requiring a person to hold it.

Today's smartphones, tablets and other similar portable electronic devices are often used with wireless speakers and have certain range and/or distance limitations between the speakers and these devices based on the wireless technology used to connect communications between the smartphone and/or consumer electronic device and a wireless speaker. Both smartphones and wireless speakers have become some of the most popular consumer electronics products that people take with them to the pool, beach, or other water related activity locations. With the exception of the known floating pool speakers, existing smartphones, tablets, and wireless speakers are not designed for use in water and it is recommended to keep them dry and away from water.

Inner tubes, rafts, and other similar flotation devices have been popular recreational items for decades, providing a fun and relaxing way for swimmers to float and lounge in the water at the beach or in a swimming pool. These types of flotation devices are also some of the most popular items that people take to the beach, pool, and/or other water related activity locations. Some flotation devices have been designed to be used as food trays in a swimming pool and some have been designed to be used as coolers for beverages in a swimming pool.

These existing flotation devices are generally most often inflatable allowing them to be lightweight, low cost, and compact for storage and transporting. Some inflatable rafts configured for a person to lay on may include a headrest and a cup holder. However, known traditional inflatable flotation devices that exist today do not provide any utility or design features for safely securing radios, wireless speakers, and/or other consumer electronics devices such as smart phones, tablets, and more.

Known flotation devices lack the ability to safely secure in place and/or enclose a portable radio and/or wireless speaker (audio device), which may come in a wide variety of different sizes and shapes of existing audio devices that may already be owned by a person and protect the audio device from excessive water exposure. If an audio device were placed on and/or within such a prior art flotation device and the flotation device were to move quickly, tip, and/or tip over, the audio device would fall into the water and risk being damaged and/or lost.

Smartphones are often needed to be in wireless communication with a wireless speaker, and such communication devices also need to be protected from water. Known flotation devices also lack the ability to safely secure in place and/or enclose one or more smartphones and/or other consumer electronic devices that may need to be nearby and in wireless communication with the wireless speaker for streaming audio while protecting the communication device from water damage and keeping it in a stationary location. If a communication device were placed on and/or within such a known flotation device and the flotation device were to move quickly, tip, and/or tip over, the communication device would fall into the water and risk being damaged and/or lost.

Existing flotation devices lack the ability to be stationary and stay in one place when used in a body of water that has moving water. As water movement increases near the flotation device, the flotation device moves to other locations. If a person were to attempt using this type of flotation device at a beach where there are inbound waves or outbound water currents, the flotation device would be pushed to shore or out to deeper waters unless the person was holding it in place. These flotation devices are not anchored in any way. A person placing an audio device and/or communication device on a conventional flotation device would either also need to take a smartphone and/or tablet with them into the lake or ocean to be near the speaker or stay within short range proximity to shore of approximately 33 feet.

Another drawback of existing flotation devices is that they are not designed to be secured in place, enclose a wireless speaker, protect a wireless speaker from getting wet, or protect a wireless speaker from falling off into the water. An audio device could be placed on a flotation device or within a compartment in a flotation device but known flotation devices only offer compartments for food or beverages and are not configured with any features to safely secure in place and/or enclose an audio device (and optionally a communication device) while allowing the audio device to emit an acceptable sound quality and volume.

Inflatable flotation devices, wireless speakers, and smartphones collectively are some of the most popular items people take with them to the pool, beach, or other related activity locations near water. It would be advantageous to provide solutions that enable users to take such portable audio devices and communications devices into a body of water and have them safely and securely float in a reasonably stationary position near one or more people enjoying time in the water. There accordingly exists a need for people to be able to safely take their existing radios and/or wireless speakers (audio devices) out into a body of water such as a river, a lake, and/or an ocean where they swim and/or congregate to socialize and listen to music and/or other audio. There also exists a need to be able to take a smartphone and/or other communication devices along with the audio device, which is needed to be in wireless communication with the audio device to stream audio.

In addition to above, there is also a need to provide a storage location configured to secure, support, contain, enclose, and protect audio devices and/or communication devices from getting wet or falling into the water and being submerged. There is a further need to keep audio devices and communication devices in a reasonably stationary location in a moving body of water where a person or group of people are congregating within a moving body of water such as a river, a lake, or the ocean. Moreover, there exists a need to provide methods and devices (such as solar chargers, batteries, and/or the speakers themselves) for charging audio devices, smartphones, and/or other communications devices used with the flotation devices.

Thus, there is a need for new innovations that expand the use of audio devices such as wireless speakers, smartphones, and/or other consumer electronics devices that are used in moving water by one or more people and a need to expand the use of flotation devices, including but not limited to inflatable flotation devices that are specifically designed to include a storage location and/or securing device for securing and/or containing at least one audio device such as radios, wireless speakers, smartphones, and other communications devices (and optionally at least one person and/or other personal items such as keys, money, credit and/or identification cards, portable battery chargers, and/or charging devices) in or onto the flotation device so that the audio device and other items can be added to, inserted, and removed from a storage location and/or compartment that protects these items from excessive exposure to water, and in some cases sun, while optionally enabling the flotation device to be kept in a reasonably stationary location and/or position in the water with an anchor and/or anchoring system and be used by people that are swimming and/or congregating in a moving body of water at a lake, an ocean, a pool, or other body of water.

SUMMARY

The example flotation device and/or floating audio device disclosed herein addresses the above noted shortcomings of existing known solutions for wireless speakers and communication devices. The example flotation device is configured to secure and/or house one or more audio devices while floating in water, which may be in a reasonably stationary position. The flotation device may include an anchor that may have a line that is adjustable in length and secured to a fixed length position to allow the anchor to reach and sit and/or be anchored at different depths of a bottom of a pool and/or water body such as a river, a lake, or an ocean. The example flotation device may hold any shape and size portable audio device and communication device. The floating audio device is configured to secure and/or house one or more portable communication devices such as a smartphone while floating in water, which may be in a reasonably stationary position. The floating audio device may include an anchor that may have a line that is adjustable in length and secured to a fixed length position to allow the anchor to reach and sit and/or be anchored at different depths of a bottom of a pool and/or water body such as a river, a lake, or an ocean. The example floating audio device may hold any shape and size portable communication device.

One aspect of the present disclosure described herein provides solutions and example descriptions and designs of devices and systems configured for providing waterproof portable audio devices (radios and/or portable wireless speakers that operate on batteries) that float in water (e.g., a floating audio device or speaker) in a relatively stationary position using an anchoring device and/or system (e.g., an anchor). The floating audio device may be configured to be secured together with and/or connected to a flotation device. The floating audio device may comprise a connection point for a line that is configured to be connected to a flotation device, which may be a separate flotation device from the floating audio device. The floating audio device may comprise an anchor and/or anchoring system that is connected to the floating audio device with a line. As described herein, the line may be adjustable in length and secured to a fixed length position to enable the anchor to reach different depths of a bottom of a pool and/or water body such as a river, a lake, or the ocean and enable the floating audio device to float at the surface of the water in a reasonably stationary position near a person using the floating audio device. The floating audio device may further include a compartment and/or storage locations configured for inserting and removing at least one communication device, such as a smartphone. The compartment and/or storage locations may be configured to secure and/or enclose the communication device within the compartment. In some instances, the compartment is heat and/or sun resistant, water resistant, and/or waterproof while also being configured to allow a user to see and operate the communication device through at least a portion of the compartment. The communication device compartment may be sized to accommodate most communication devices available in the market.

The floating audio device may further include at least one connection point configured for securing a separate portable waterproof communication device compartment and/or enclosure (e.g., a portable waterproof communication device compartment) to the floating audio device to enable the portable waterproof communication device compartment and/or enclosure to be securely connected to the connection point on the floating audio device to keep the communication device from falling into the water and being completely submerged. It should be appreciated that any of the waterproof communication device compartments described herein may be completely and/or partially submerged under water while being secured to the floating audio device to provide cooling for the communication device in the hot sun. The compartment may comprise a material and/or technology that enables touchscreens, buttons, and/or other touch controls to be operated through at least one covered portion of the compartment. The floating audio device may be designed to be dual-use and can be used on land and in water.

The floating audio device may further be configured to be manufactured using the same materials as existing audio devices and are known to those skilled in the art such as electronics, polyvinyl chloride ("PVC"), plastics and/or polymers, silicone rubber, and other materials. The audio device may have an area of its construction such as at least one of a bottom, a top, a side, or a section around its outer perimeter that is configured to contain a built-in inflatable flotation device that can be inflated when a user takes the audio device into the water. It should be appreciated that the entire housing or a substantial portion thereof may be inflatable and comprise the components needed for the audio device within the inflatable housing.

The floating audio device may further include an anchor as a removable portion of the floating audio device, or the anchor may be left on so that when the floating audio device is to be used on land and not floating, the anchor may be an integrated part of, or mounted to the floating audio device in a pleasingly aesthetic manner. The anchor may comprise a hollow portion to allow the anchor to be filled with sand, rocks, or other material that could be used to increase the weight of the anchor to a sufficient level of weight need to secure the anchor at the bottom of a water body. The anchor may be configured to be similar to a water resistant bag or a pouch made of PVC, rubber, nylon, or other water resistant material that can be filled with one or a combination of water, sand, and/or rock and be folded up to a size that can be placed inside a compartment of the floating audio device. The anchor may further be configured to be something similar to a spike and/or tent steak that could be pressed into the sand and/or a bottom floor of a body of water to secure the anchor. It should be appreciated that the floating audio devices described herein may be reasonably and/or almost exactly similar to match the various shapes, sizes, materials, colors, branding, and/or advertising capabilities of any existing and/or new modified versions and/or designs of audio devices known in the market and to those skilled in the art with the exception of adding the novel features of the floating audio devices and/or flotation devices as described herein to such similar and new embodiments.

Another aspect of the present disclosure described herein provides solutions and example descriptions of designs, devices, and systems for providing flotation devices including inflatable flotation devices having a securing device, location, and/or compartment configured for securely supporting and/or containing various shapes and sizes of portable audio devices (such as radios and/or portable wireless speakers that are not designed to float in water on their own or get too wet) and optionally, portable communication devices (such as smartphones, tablets, and wearables that are needed to be in communication with the portable audio devices to stream audio and generally are not designed to float in water on their own or get too wet). Such compartments may be configured to be various shapes including but not limited to a round shape, a square shape, a rectangular shape, a triangular shape, or other shape, some of which may be optimized for projecting audio such as a cone, a dish, a parabola, or other shapes that can improve the projection of sound. Such compartments may also be configured to be various sizes in depth, length, width, and/or diameter that may be in the range anywhere between 3 to 36 inches and more preferably between the range of 6 to 15 inches in order to safely secure, contain, and/or support common portable audio devices available in the market. Such flotation devices may be configured to be various shapes including but not limited to a round shape, a square shape, a rectangular shape, a triangular shape, or other shape, some of which may be optimized for projecting audio such as a cone, a dish, a parabola, or other shapes that can improve the projection of sound. Such flotation devices may also be configured to be various sizes in depth, length, width and/or diameter that may be in the range anywhere between 6 to 84 inches and more preferably between the range of 8 to 16 inches in depth and/or 12 to 84 (but may be up to 144) inches in length, width, and/or diameter in order to safely secure, contain, and/or support at least one or a combination of a person, common portable audio devices, common communication devices, other personal items such as keys, money, identification cards, credit cards, and/or at least one beverage container. Such flotation devices may further comprise an anchoring device and/or system.

The flotation device may be configured to be connected to at least one other flotation device or to another secure location. The flotation device could also be configured to be connected to an anchor or other item with a line that is a fixed length, or may optionally be adjustable in length and secured to a fixed length position to enable the anchor to reach different depths of a bottom of a pool and/or other body of water such as a river, a lake, or an ocean and allow the flotation device to float at the surface of the water (while supporting the at least one audio device and/or communication device) and stay in a reasonably stationary position near a user using the flotation device, an audio device, and/or communication devices contained within the compartments of the flotation device or secured to a securing device of the flotation device. The anchor may be configured to be similar to a water resistant bag or a pouch made of PVC, rubber, nylon, or other water resistant material that can be filled with one or a combination of water, sand, and/or rock and be folded up to a smaller size. The anchor may be sufficiently weighted to hold the flotation device in place when floating in water, or the anchor may comprise a hollow portion to allow the anchor to be filled with at least one of water, sand, rocks, or other material that could be used to increase the weight of the anchor to a sufficient level of weight need to secure the anchor in place at the bottom of a water body. The anchor may further and/or alternately include something similar to a spike and/or tent steak that could be pressed into the sand and/or bottom floor of a water body to secure the anchor. The spike and/or steak may be configured to be removable or a fixed portion of the anchor embodiment. The flotation device may also comprise at least one securing device, compartment, and/or locations configured to secure and/or contain at least one portable audio device, and optionally, the same or at least one separate securing device, compartment, and/or storage location configured to secure and/or contain at least one portable communication device configured to be in communication with the audio device. The compartment(s) may be configured to enable a user to insert and/or remove the at least one audio device, and/or optionally at least one communication device, and optionally other personal items such as money, keys, identification and/or credit cards, battery chargers, and/or charging devices within the compartment(s). At least one of the compartment(s) may be completely or partially heat and/or sun resistant, and water resistant and/or waterproof. Additionally, at least one of the compartments may be configured for enabling a user to see and operate the audio device and/or the communication device through at least a portion of the compartment(s) or a cover for the compartment(s).

A base or floor of the compartment(s) may be configured to include a drain for water, or a compartment bottom and/or floor that is configured to drain water. The compartment bottom and/or floor may comprise at least one drain hole or may be made of a mesh material for allowing water to drain. The at least one drain hole may include a one-way valve to let water only flow out of the compartment. The flotation device may be configured to include at least one securing device and/or connection point (e.g., a securing device) for the audio device such as at least one of a clip, a hook, a grommet and/or ring, a strap, or a stretchable material such as elastic or rubber that may be an integrated part of and/or connected to the flotation device and/or a part of the flotation device and positioned within and/or over at least a portion of the compartment and/or the compartment floor such that at least one of at least one audio device and/or at least one communication device may be connected to the securing device or held by the securing device when the audio device and/or communication device is placed in the compartment and/or under the strap, the stretchable material, and/or between the stretchable material and the floor to secure in place the at least one audio device and/or at least one communication device within the compartment. The strap and/or stretchable material by be configured to allow a reasonable amount of audio to pass through when the material is placed over the audio device. The at least one audio device compartment may further be configured to comprise at least one material that improves and/or enhances the reflection of audio waves. The flotation device may further comprise at least one compartment configured to safely secure at least one battery and/or portable battery charger and/or battery charging device. The flotation device may further comprise at least one connection point configured for securing a separate portable waterproof communication device compartment and/or enclosure to the flotation device to allow the portable waterproof communication device compartment and/or enclosure to be securely connected to the connection point on the flotation device to keep the communication device from falling into the water and being submerged.

It should be appreciated that any of the compartments described herein may be completely and/or partially submerged under water while being an integral part of or secured to the flotation device to provide cooling and/or heat sinking using the water to remove heat generated by the audio devices and/or communication devices while in the hot sun. The flotation device may further comprise at least one cover for covering the at least one audio device and/or communication device compartment. The compartment(s) and/or compartment cover(s) may comprise a material and/or technology that enables touchscreens, buttons, and/or other touch controls to be operated though at least one covered portion of the compartment. The compartment(s) and/or compartment cover(s) may further comprise a material and/or technology that enables reducing the level of heat that reaches and/or is absorbed by the at least one audio device and/or communication device. The at least one cover covering the audio device and/or audio device compartment may be configured and/or designed to function similar to a speaker diaphragm to provide for improved audio output from an audio device contained with a compartment of the flotation device. The flotation device may also include at least one handle for holding on to and/or pulling the flotation device. The flotation device may further include as least one connection point to connect the flotation device to a water vehicle so that the flotation device can be pulled in the water by the water vehicle. The flotation device may further comprise a configuration that includes a game and/or sport capability such as a water basketball hoop and/or volleyball net. The flotation device may further be configured to include light reflective material. The flotation device may further be configured to include lighting devices such as LEDs that operate on battery power. It should be appreciated that the flotation devices described herein, including but not limited to the inflatable flotation devices as described herein, may be reasonably and/or almost exactly similar to match the various shapes, sizes, materials used, colors, branding, and/or advertising capabilities of any existing and/or new modified versions and/or designs of flotation devices and/or inflatable flotation devices known in the market and to those skilled in the art with the exception of adding the novel features of the flotation devices, as described herein.

Another aspect of the present disclosure described herein provides an improved floating speaker that includes an anchoring device and/or system to enable a user to take the speaker into a body of water that has moving water such as a pool, river, lake, or ocean and keep the floating speaker in a reasonably stationary location without floating away. The present disclosure further provides new types of flotation devices, including but not limited to inflatable flotation devices that are configured to include an anchoring system and/or device and securely contain at least one portable audio device such as a radio and/or wireless speaker, and optionally one or more portable communication device such as a smartphone, and optionally one or more beverages, and optionally ice, and optionally one or more persons. The flotation devices disclosed herein flotation are configured to offer more utility including but not limited to a floating entertainment system, and more specifically an inflatable floating entertainment system configured to safely secure and/or support portable consumer electronics. The floating speaker may be configured to be partially and/or completely waterproof or waterproof in at least one section of the floating speaker that may rest in water while another section is supported on a surface of water with an integrated and/or attached buoyant material such a foam, an inflatable flotation device, and/or other buoyant material which may be located at a bottom, a center, a top and/or a combination thereof on the floating speaker.

Another aspect of the disclosure described herein is to provide a floating speaker that includes an anchoring system that can also be used as a storage compartment and/or sales/retail packaging for the floating speaker and a line. The anchor may be configured to be made of a solid material, comprise a hollow section, and/or may be a soft flexible material and configured to be similar to a pouch or bag that can be sealed. The anchor may be configured to be similar to a water resistant bag or a pouch made of PVC, rubber, nylon, or other water resistant material that can be filled with one or a combination of water, sand, and/or rock and be folded up to a smaller size.

Another aspect of the disclosure described herein is to provide a flotation device that includes an anchoring system that can also be used as a storage compartment and/or sales/retail packaging for the flotation device, the anchor, the line and/or an audio device. The anchor may be configured to be made of a solid material, comprise a hollow section, and/or may be a soft flexible material and configured to be similar to a pouch or bag that can be sealed.

Another aspect of the disclosure described herein is to provide a flotation device, and ideally an inflatable flotation device (either of which being a flotation device according to the disclosure) that is configured to secure and/or contain at least one portable audio device such as a wireless speaker and/or portable radio (hereinafter "audio device") in a compartment that may be a water resistant and/or waterproof compartment, and optionally at least one smartphone and/or other portable consumer electronic devices (hereinafter "communication device") that may be configured to be in wireless communication with the audio device secured and/or contained within the flotation device to be secured and/or contained in the same or separate compartment, which may be a water resistant and/or waterproof compartment. The floating audio device may be configured to be secured together with and/or connected to a communication device. The flotation device is for use in water while securing and/or containing the at least one audio device and the optional at least one communication device. The flotation device may also be configured to secure and/or contain the at least one communication device near the speaker. The at least one speaker may be specifically designed to be optimized for the flotation device and is ideally IP67 or IP68 rated. However, the flotation device may also be configured to secure and/or contain various shapes and sizes of other commercially available audio devices that are not recommended for wet locations. The flotation device may also be configured to include an anchor for anchoring the flotation device to a reasonably stationary location in the water regardless of current and waves.

Another aspect of the disclosure is to provide a flotation device for securing and/or containing at least one audio device and at least one communication device to include at least one beverage holder and/or compartment. The beverage compartment may be configured to hold one or more beverages and may also be configured to contain ice. The flotation device may further include a thermal insulating material.

Another aspect of the disclosure is to provide such a flotation device to also be configured for supporting at least one person to float in water on the flotation device along with the at least one audio device and at least one communication device.

Another aspect of the disclosure is to provide a flotation device that may further comprise at least one connection point configured for securing and/or hooking on at least one audio device and/or at least one communication device to the flotation device and/or within a compartment of the flotation device. The connection point may be configured to be at least one of a clip, a hook, a grommet and/or ring, a strap, or a stretchable material such as elastic or rubber band that may be positioned over at least a portion of the compartment and/or the compartment floor such that at least one of at least one audio device and/or at least one communication device may be placed under the strap and/or stretchable material and/or between the stretchable material and the floor to secure in place the at least one audio device and/or at least one communication device within the compartment. The strap and/or stretchable material by be configured to enable a reasonable amount of audio to pass through when the material is placed over the audio device.

Another aspect of the disclosure is to provide a flotation device that may further comprise at least one connection point configured for securing and/or hooking on at least one audio device and/or at least one communication device on the same and/or separate dedicated connection point for at least one communication device. The audio device may be configured to be contained in a separate portable waterproof audio device compartment and/or enclosure and the communication device may be configured to be contained in the same or in a separate portable waterproof communication device compartment and/or storage location and/or enclosure. At least one of the portable waterproof audio device compartment and/or enclosure and/or the portable waterproof communication device compartment and/or enclosure may be configured to comprise a clip, a hook or other device that can securely connect to the connection point on the flotation device to keep the audio device and/or the communication device from being in the water and/or falling into the water and being submerged.

Another aspect of the disclosure comprises at least one floating audio device configured to comprise at least one of the compartments as described herein that may be completely and/or partially submerged under water while being an integral part of or secured to the floating audio device. In this aspect, the compartments may be cooled by water, which provides cooling and/or heat sinking for the audio devices and/or communication devices while in the hot sun. The floating audio device may further comprise at least one cover for covering the at least one compartment.

Another aspect of the disclosure comprises at least one flotation device configured to comprise at least one of the compartments as described herein. The compartments may be completely and/or partially submerged under water while being an integral part of or secured to the flotation device. In this aspect, the compartments may be cooled by using water, which provides cooling and/or heat sinking for the audio devices and/or communication devices while in the hot sun. The floating audio device may further comprise at least one cover for covering the at least one compartment.

Another aspect of the disclosure is to provide a floating audio device that may further comprise at least one connection point configured for securing and/or hooking on at least one communication device on the connection point for the communication device. The communication device may be configured to be contained in a separate portable waterproof communication device compartment and/or enclosure. The portable waterproof communication device compartment and/or enclosure may be configured to comprise a clip, a hook, a strap, or other device that can securely connect to the connection point on the floating speaker to keep the communication device from being in the water and/or falling into the water and being submerged. It is contemplated that if the portable waterproof communication device compartment and/or enclosure is configured to be submerged with the communication device inside, then the portable waterproof communication device compartment and/or enclosure may be in the water while hanging from the floating audio device and keep the communication device cool to prevent it from overheating from over exposure to the hot sun.

Another aspect of the disclosure is to provide a flotation device that may further comprise at least one connection point configured for securing and/or hooking on at least one communication device on the connection point for the communication device. The communication device may be configured to be contained in a separate portable waterproof communication device compartment and/or enclosure. The portable waterproof communication device compartment and/or enclosure may be configured to comprise a clip, a hook, a strap, or other device that can securely connect to the connection point on the flotation device to keep the communication device from being in the water and/or falling into the water and being submerged. It is contemplated that if the portable waterproof communication device compartment and/or enclosure is configured to be submerged with the communication device inside, then the portable waterproof communication device compartment and/or enclosure may be in the water while hanging from the floating audio device and keep the communication device cool to prevent it from overheating from over exposure to the hot sun.

Another aspect of the disclosure is to provide the floating audio device and/or the flotation device with at least one shark and/or stingray repellent material and/or device. The floating audio device may include a shark and/or stingray repellent device and/or circuit that may be attached and/or an integrally formed with the floating audio device. The shark and/or stingray repellent material may be attached, enclosed, and/or integrally formed with the floating audio device and include Electropositive Metals ("EPMs"). EPMs are a class of shark repellent materials that produce a measurable voltage when immersed in an electrolyte such as seawater. The voltages produced are as high as 1.75 VDC in seawater. It is hypothesized that this voltage overwhelms the ampullary organ in sharks, thereby producing a repellent action. Since bony fish lack the ampullary organ, the repellent is selective to sharks and rays. The process is electrochemical, so no external power input is required. The same rechargeable battery used for the floating audio device could be used to power the shark and/or stingray repellent device and/or circuit.

Another aspect of the disclosure is to configure a flotation device to include at least one compartment for securing and/or enclosing at least one audio device and at least one communication device to prevent water and/or excessive water from reaching the audio device and/or communication device, and/or prevent the audio device and/or communication device from falling into the water. The flotation device may also include at least one separate compartment for securing and/or containing at least one communication device separate from the audio device compartment. Additionally or alternatively, the flotation device may include multiple compartments for multiple communications devices to be operable by multiple users. The compartments that house the audio devices and communication devices may be configured to be reasonably covered and/or sealed to be water resistant or waterproof, and preferably configured for restricting and/or preventing water, sand, and other unwanted elements from entering the compartment(s) while allowing audio from the audio device(s) contained in the compartment(s) to efficiently project audio outward from the compartment and be heard by a person on or near the flotation device at reasonable quality of audio and sufficient volume. The flotation device compartments may comprise a transparent material for the cover that enable a user of the communication devices and/or audio devices to effectively use and control the communications devices and/or audio devices through the transparent cover. The transparent cover may be configured to enable capacitive touch, resistive touch, or pressure touch on the communication device having a touch screen, similar to existing touch capable transparent covers and/or materials used today with touchscreens on smartphones and other communication devices. The flotation device compartment(s) may comprise at least one device and/or material configured to secure the at least one audio device and/or communication device in place within the compartment. Additionally, the device and/or material may further be configured to allow a reasonably good level and/or quality of audio to pass through when it is positioned over the audio device's speaker.

Another aspect of the disclosure is to provide a flotation device with an anchor device and/or anchoring system that is configured to secure and/or hold the flotation device in a reasonably fixed area and/or location in the water at various depths of water near a person using the flotation device for the audio devices and/or communication devices. The anchoring system may be configured to be a container and/or include a hollow portion that can house the inflatable version of the flotation device when it is deflated and compacted, and optionally the same anchoring container may then be filled with sand, rocks, or other weighted materials and/or elements when the flotation device is inflated and in use. The anchor may be configured to be made of a solid material, comprise a hollow section, and/or may be a soft flexible material and configured to be similar to a pouch or bag that can be sealed. The anchoring device container may be configured to be securely connected and/or connectable to at least one location on the flotation device via a rope, a string, or a line including but not limited to a fishing line, a chain, or other linear source (e.g., a line and/or an anchor line) that can be in connection with the flotation device (and/or the floating speaker). The anchoring device is configured to be placed at a bottom and/or a floor of a water body that the flotation device is floating in such as a pool, a lake, an ocean, and/or a river. The anchoring device/container may include an opening on one end, which may also include a lid that is removable. Optionally, the lid may be reversible such that either side of the lid may be connected and/or screwed onto the container. One side of the lid may be connected to the line and the flotation device such that when the flotation device is deflated, the lid can be flipped over and the line and the flotation device can be placed into the container. In this example, the lid can then be secured to the container, thereby allowing the flotation device be easily removed and inflated again. A person may fill the container and/or the hollow portion of the anchor with a weighted element such as sand, a rock or other material or fluid. In the case of a floating speaker, the anchor may be a removable part of the floating speaker. Alternatively, the anchoring container may enclose the floating speaker when not in use. As such, a user can fill the container the same way using sand, rocks, or other weighted elements after the floating speaker is removed.

Another aspect of the disclosure is to provide a flotation device that is configured such that when the flotation device is not fully inflated it has at least two sections and/or body parts that do not securely meet and/or meet with limited pressure to allow for a user to insert a speaker, and optionally at least one communication device, into the at the least one compartment so that when the flotation device is sufficiently and/or fully inflated, the at least two sections and/or body parts of the flotation device meet together tightly with sufficient pressure to seal the audio device into the compartment. The same configuration could be used for the optionally separate communication device compartments to provide water resistant and/or waterproof compartments that are formed after sufficiently inflating the flotation device.

Another aspect of the disclosure is to provide a flotation device that is configured to include at least one cover. The cover may be configured to cover a portion of, or the entire audio device and/or at least one communications device. At least one section of the cover may be permanently connected to the flotation device or the cover may be completely removable and securable to the flotation device. The cover may also be integrally formed with the flotation device and may inflate along with the entire flotation device, thereby taking the desired form of the cover when inflated. The cover may be transparent and configured to allow a user to control and/or operate the speaker and/or the communication device through the cover. A portion of the cover may be thinner than another portion so that the thinner portion may allow for audio to pass through the cover efficiently. The flotation device and/or at least the compartment cover may be constructed using UV protective material or material that reduces the amount of heat and/or sunlight that could reach the audio device and/or communication device to help prevent the audio device and/or the communication device from overheating in the sun. The cover may also be inflatable and configured to be securely press fit into the flotation device to form a tighter fit when covering and/or enclosing the speaker and/or communication device into the compartment(s).

Another aspect of the invention is to provide such a flotation device to be configured to comprise at least one hole, and preferably multiple holes which may or may not be located near or as part of the audio device compartment and/or other compartments such as the communication device compartments, beverage holders and/or compartments, or other compartments. The at least one hole may be configured to limit and/or prevent water accumulation from splashes while also allowing water and/or other elements to drain from the flotation device. Preferably the at least one hole will be part of or near the floor of the at least one compartment which secures and/or contains the audio device and/or communication devices to prevent them from sitting in water and other elements that may accumulate at the base of the at least one compartment. It is contemplated by the inventor that a floor could be configured to have cross sections of material such as a mesh with holes between the cross sections similar to a grate or net and the floor could be made of the same or different material as the flotation device and formed and/or attached as a section of the flotation device construction.

Another object of this disclosure is to provide a flotation device that supports at least one person to float in water and/or lay on a surface of a water body. The flotation device may include at least one headrest near the at least one speaker compartment such that the person(s) can have the audio output near the persons head and/or the headrest. Such a flotation device may additionally include at least one communication device compartment near the end of the armrest at the location where a person would have their hands. The compartment may optionally be configured to enable the user to operate the communication device and/or the speaker though the cover as would other compartment covers for the flotation devices described herein.

As described above, the at least one audio device (or floating speaker) and the at least one communication devices may be configured to be in wireless communication with each other while contained in the compartment(s) of the flotation device (or floating speaker).

Another aspect of the disclosure is to provide a floating audio device with at least one solar charging system for the at least one audio device and/or the at least one communication device. A solar panel of the solar charging system could be integrated into the surface of the floating audio device.

Another aspect of the disclosure is to provide a flotation device with at least one solar charging system for the at least one audio device and/or the at least one communication device. A solar panel of the solar charging system could be integrated into a surface area of the flotation device body or into one or more of the flotation device compartment covers.

Another object of the disclosure is to provide a flotation device that is configured to comprise at least one compartment configured to securely contain and/or support at least one battery, which may be part of the solar charging system or may be a portable rechargeable battery and/or battery charger that can be used to charge the at least one audio device and/or the at least one communication device.

Another aspect of the disclosure is to provide a flotation device with at least one thermal protective material and/or cover that is placed over the at least one audio device and/or communication device compartments for reducing heat transferred to the at least one audio device and/or the at least one communication device. The cover also prevents the audio device and/or the communication device from overheating due to direct sun exposure. The thermal protective material may be silicone rubber, a heat reflective material similar to a solar shield used inside a windshield of a car, or other material configured to absorb and/or reflect a sufficient level of sun and/or heat to reduce a level of heat that is transferred to the at least one speaker and/or the communications device. It should also be appreciated that a thermal cooling material may be configured to be part of the flotation device to provide cooling for beverages, ice, an audio device, and/or a communication device. It should also be appreciated that a thermal conductive material, a thermal reflective material, and/or a thermal cooling material may be used to construct part or all of the flotation device. The thermal conductive material could be used to transfer the temperature of the cooler water to other areas of the flotation device such as the beverage compartment, an ice compartment, and/or the compartments that contain the audio device and/or the communication device, thereby helping keep the audio device and/or communication devices from overheating due to extended sun exposure or high ambient temperatures that may be common when people are swimming in a lake and/or ocean on a hot summer day.

Another object of this disclosure is to provide such a flotation device that includes a solar powered charging system with appropriate connectors to electrically connect an audio device and/or communication devices contained within the flotation device. The solar powered charging system is configured to electrically charge batteries of the audio device and/or the communication devices.

Another object of the disclosure is to provide such a floating audio device and/or flotation device that comprises at least one reflective material and/or an integrated lighting device (such as at least one LED, OLED, or other device that produces light) that is configured to provide constant or modulated illumination of one or a combination of colors of light form the interior and/or exterior of the floating audio device and/or the flotation device. The illumination device may be configured to provide light that is visible from at least one of the top, the bottom, or the inside through the floating audio device and/or flotation device. It should be appreciated that at least a portion of the floating audio device and/or flotation device may configured to be transparent and/or semi-transparent.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE DRAWINGS

FIGS. 4A to 4C show schematic views of the flotation device of FIG. 1 with a cavity compartment, according to an example embodiment of the present disclosure.

DETAILED DESCRIPTION

Figure 1:
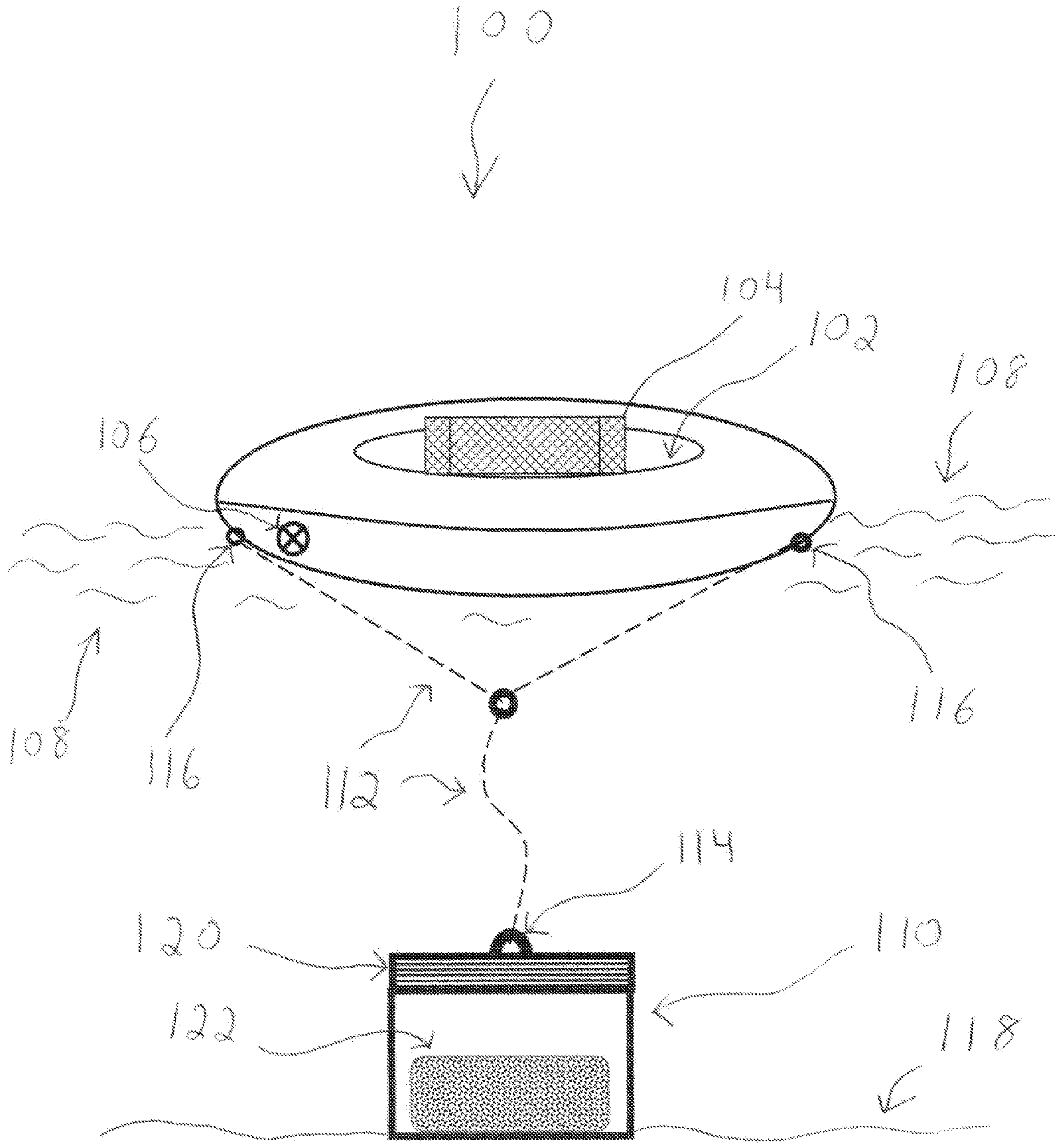
FIG. 1 shows a schematic view of a flotation device, according to an example embodiment of the present disclosure.

FIG. 1 shows an example embodiment of a flotation system that includes a flotation device 100 (e.g., a flotation apparatus), according to an example embodiment of the present disclosure. The flotation device 100 includes at least one audio device compartment 102 configured to secure and/or contain at least one audio device 104 that may be inserted and/removed from the compartment 102. In some embodiments, the audio device 104 may also include a video screen, such as a television. The compartment 102 may be configured to include a drain for water or a compartment bottom and/or floor that is configured to drain water. The compartment bottom and/or floor may be made of a mesh material for allowing water to drain. The compartment bottom and/or floor may further be configured to sit above water. The compartment bottom and/or floor may further be configured to sit above water which preferably is one inch or more above water when the at least one audio device 104 is placed in the compartment and adds weight to the floor. The flotation device 100 may be configured to include at least one securing device 103 and/or connection point (e.g., a securing device) for the audio device such as at least one of a clip, a hook, a grommet and/or ring, a strap, or a stretchable material such as elastic or rubber that may be an integrated part of and/or connected to the flotation device 100 and/or a part of the flotation device 100 and positioned near or over at least a portion of the compartment 102 and/or the compartment floor such that at least one of the at least one audio device 104 and/or at least one communication device may be connected to the securing device 103 or held by the securing device 103 when the audio device 104 and/or communication device is connected to, held by, or placed under the securing device 103 such as a strap and/or stretchable material and/or between the securing device 103 stretchable material and the floor to secure in place the at least one audio device 104 and/or at least one communication device within the compartment 102. The securing device (such as an elastic band) by be configured to allow a reasonable amount of audio to pass through the material when placed over the audio device 104.

The at least one audio device compartment 102 may further be configured to comprise at least one material that improves and/or enhances reflection of audio waves. In an example, at least a portion of the side walls 102*a* of the audio device compartment 102 may be configured to be firmer than the other portions of the flotation device 100 such that audio waves better reflect off the side walls 102*a* and out of the audio device compartment 102. It is contemplated that the side walls 102*a* of the audio device compartment 102 may be made of the same material as the flotation device 100 but either thicker or added to the flotation device as one or more additional layers to produce the side walls 102*a*.

The flotation device 100 may further comprise at least one compartment 102 configured to safely secure at least one battery and/or portable battery charger and/or battery charging device. The flotation device 100 may be an inflatable flotation device 100 similar to existing inner tubes, rafts, and other flotation devices used for water activities in a pool, a lake, an ocean, a river, or other body of water. The flotation device 100 may be made of the same type of materials (such as PVC) and thickness (such as between the range of 0.1 millimeters ("mm") to 0.8 mm but more preferably between the range of 0.15 mm to 0.4 mm) commonly used to manufacture inflatable flotation devices. The flotation device 100 may include an air valve 106 configured for allowing air to be inserted into and removed from the flotation device 100 for inflating and deflating the flotation device 100. The flotation device 100 is configured to float in water 108 similar to other flotation devices known in the art.

The flotation device 100 may be configured to include and/or be connected to at least one anchor 110 that is securely connected to the flotation device 100 via at least one line 112. The at least one line 112 is configured to be securely connected to both the flotation device 100 and the anchor 110. The example anchor 110 comprises at least one anchor connection point 114 for connecting the line 112 to the anchor 110. Additionally, the flotation device 100 comprises at least one flotation device connection point 116 for connecting the line 112 to the flotation device 100. The length of the line 112 is configured to be a length that may be adjustable in length and secured to a fixed length position and enables the anchor 110 to sit on a bottom and/or floor 118 of a water body while allowing the flotation device 100 to float on the surface of the water body 108 in a reasonably stationary location, thereby allowing one or more people to congregate near and around the flotation device 100 and not need to hold it in place while listening to music and/or other audio entertainment projecting from the audio device 104.

The anchor may further be configured to include at least one spike and/or tent steak that could be pressed into the sand and/or bottom floor of a water body to secure the anchor in place. The line 112 may be configured to be removable from at least one of the flotation device 100 and/or the anchor 110. Alternatively, the line may be configured to be fixed and not removable from at least one of the flotation device 100 and/or the anchor 110. The anchor 110 may be configured to be made of a solid material to provide sufficient weight needed to secure the flotation device 100 in place. It is more preferable that the anchor 110 is a light weight material and configured to be in the form of a container comprising a hollow portion and at least one removable lid 120 and/or opening to access the container and/or hollow portion of the anchor. The lid 120 is configured to be removable to allow the anchor 110 to be filled with sand, rock, or other weighting material 122 that is sufficiently heavy enough to secure the anchor 110 in place.

When the flotation device is deflated to be stored away, the container configuration of the anchor 110 may be used to house the deflated flotation device 100, the at least one line 112, and/or other items including but not limited to the audio device. For the container configuration of the anchor 110, the anchor 110 may be configured to comprise a female threaded section inside on at least one end opening of the anchor 110 and at least some portion of the outer diameter of the lid 120 may be configured to comprise a male thread that can be screwed into the end of the anchor 110 to seal the anchor 110. Alternately, at least one end of the anchor 110 may be configured as a male threaded end and the lid 120 may be configured to have female threads on opposing sides, where one side may comprise the at least one anchor connection point 114. When the flotation device is in use, one side of the lid 120 can be secured to the anchor 110. Then when the flotation device 100 is deflated, the flotation device 100 is stored inside the anchor 110 and the other threaded side of the lid 120 may be secured to the anchor 110. At least one of the at least one anchor connection point 114 and/or the at least one flotation device connection point 116 may be configured to be a mechanical connection point to allow for the length of the line 112 to be adjusted and secured back into place. The flotation device 100 may be configured to include an advertisement and/or company branding on a visible exterior of the flotation device 100.

In alternative embodiments, the flotation device 100 may further just include a line 112 that is configured to be connected to the flotation device 100 and a net or container that is configured to hold a weighted item as an anchor, such as a rock such that the line 112 can be secured to and allow the flotation device 100 to float on the surface of the water 108 in a reasonably stationary location. The flotation device 100 may also be used without the anchor and still provide the utility of securing and/or containing at least one audio device and optionally at least one communication device. The anchor 110 may be configured to be made of a solid material, comprise a hollow section, and/or may be a soft flexible material and configured to be similar to a pouch or bag that can be sealed. It is contemplated that the anchor 110 may be configure as a bag and/or pouch (anchoring device) with an opening on at least one end and be used in place of a container with a lid. The bag and/or pouch may be made of a durable material such as PVC, silicone rubber or other rubber, and/or a material strong enough to contain the weighted material inserted into the anchor.

Figure 2:
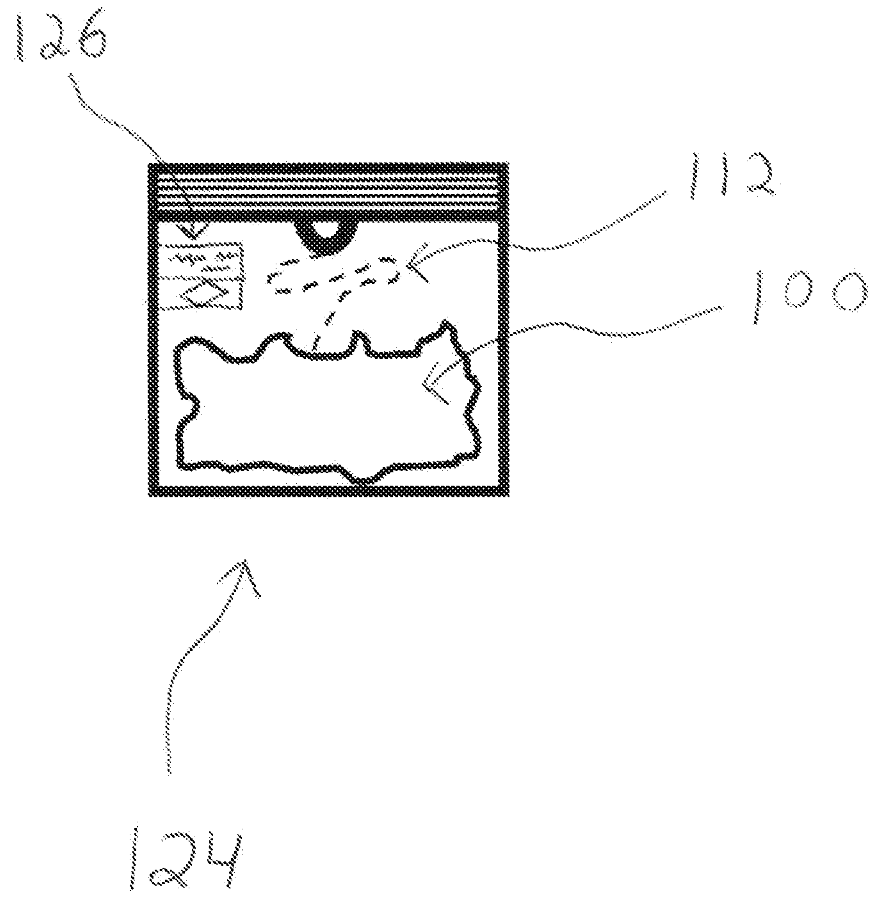
FIG. 2 shows a schematic view of an anchor of the flotation device of FIG. 1, according to an example embodiment of the present disclosure.

FIG. 2 discloses another example embodiment of an anchor 124. The anchor 124 is configured to be a container similar to the anchor 110 described in conjunction with FIG. 1. In this example, the flotation device 100 is shown as being deflated and packed inside the anchor 124 along with the line 112. This type of container configuration of the anchor 110 and/or 124 serves multiple purposes including but not limited to an anchor 110 and/or 124, a storage unit for the flotation device 100, and/or as a package for the flotation device product at point of purchase. The anchor 124 may have marketing, advertising, instructions for product use, and/or other informative material 126 on its exterior as well as instructions inserted into the interior. The line 112 may be configured to be able to stay connected to the lid 120, the anchor 110, and/or the flotation device 100 during storage. The lid 120 is secured to the anchor 110 and seals the flotation device 100 inside the anchor. The flotation device 100 may include an advertisement and/or branding 126 on a visible exterior of the flotation device 100. The anchor 110 may be configured to be made of a solid material, comprise a hollow section, and/or may be a soft flexible material and configured to be similar to a pouch or bag that can be sealed.

Figure 3:
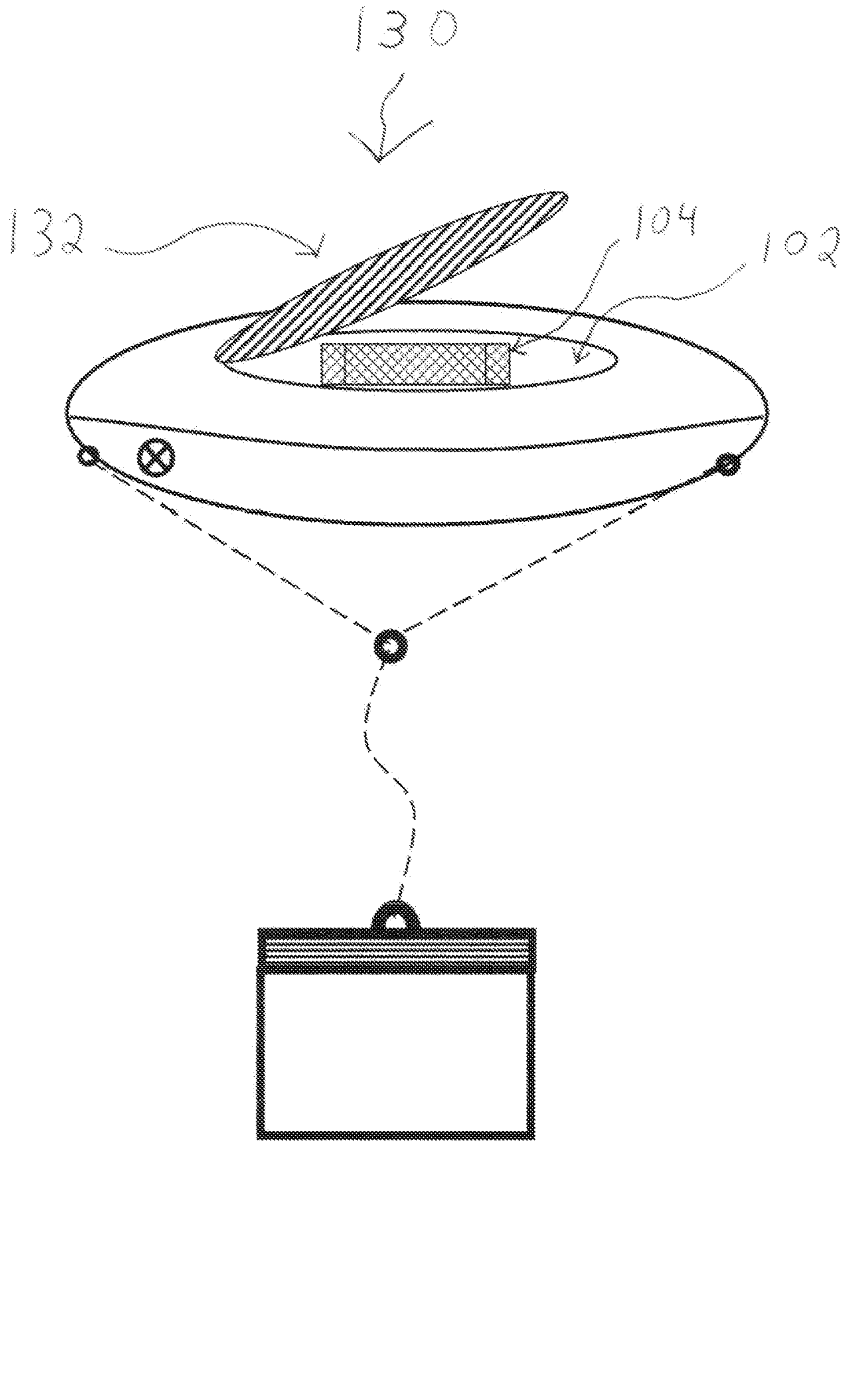
FIG. 3 shows a schematic view of the flotation device of FIG. 1 with a compartment cover, according to an example embodiment of the present disclosure.

FIG. 3 discloses another example embodiment of a flotation device 130. The flotation device 130 includes at least one audio device compartment cover 132 configured to cover the at least one audio device 104, which is secured and/or contained inside the at least one audio device compartment 102. The audio device compartment cover 132 may be attached to the flotation device 130 and/or may be an inflatable portion of the flotation device 130. The audio device compartment cover 132 may be made of a material that reflects heat and/or sun, or may be made of a transparent material that allows for visibility and/or control of the audio device 104 through the material. The audio device compartment cover 132 may be configured to completely seal the at least one audio device 104 (and any other optional items that may fit) inside the audio device compartment 102. The seal may be a water resistant and/or water tight seal. The audio device compartment cover 132 may additionally be made of a material that still allows for quality audio to project outward from the flotation device 130 even when the audio device 104 is sealed within the audio device compartment 102 or positioned over the audio device compartment 102. The flotation device 130 may include an advertisement and/or branding on a visible exterior of the flotation device 130.

FIG. 4A shows another example embodiment of the flotation device 130. In FIG. 4A the audio device cover 132 is closed, thereby sealing the audio device 104 within the at least one audio device compartment 102. As shown in the expanded image of FIG. 4B, the outer perimeter of the audio device cover 132 comprises a female cavity compartment 134 and the outer perimeter of the audio device compartment 102 comprises a male section 136 on the outer rim of the flotation device 130 for providing an improved way of sealing and mating the audio device cover 132 to the flotation device 130 to prevent water, sand, or other elements from entering the audio device compartment 102. FIG. 4C shows how the male and female sections of the audio device cover 132 and the flotation device 130 meet to provide a secure seal. The flotation device 130 may include an advertisement and/or branding on a visible exterior of the flotation device 130.

Figure 5:
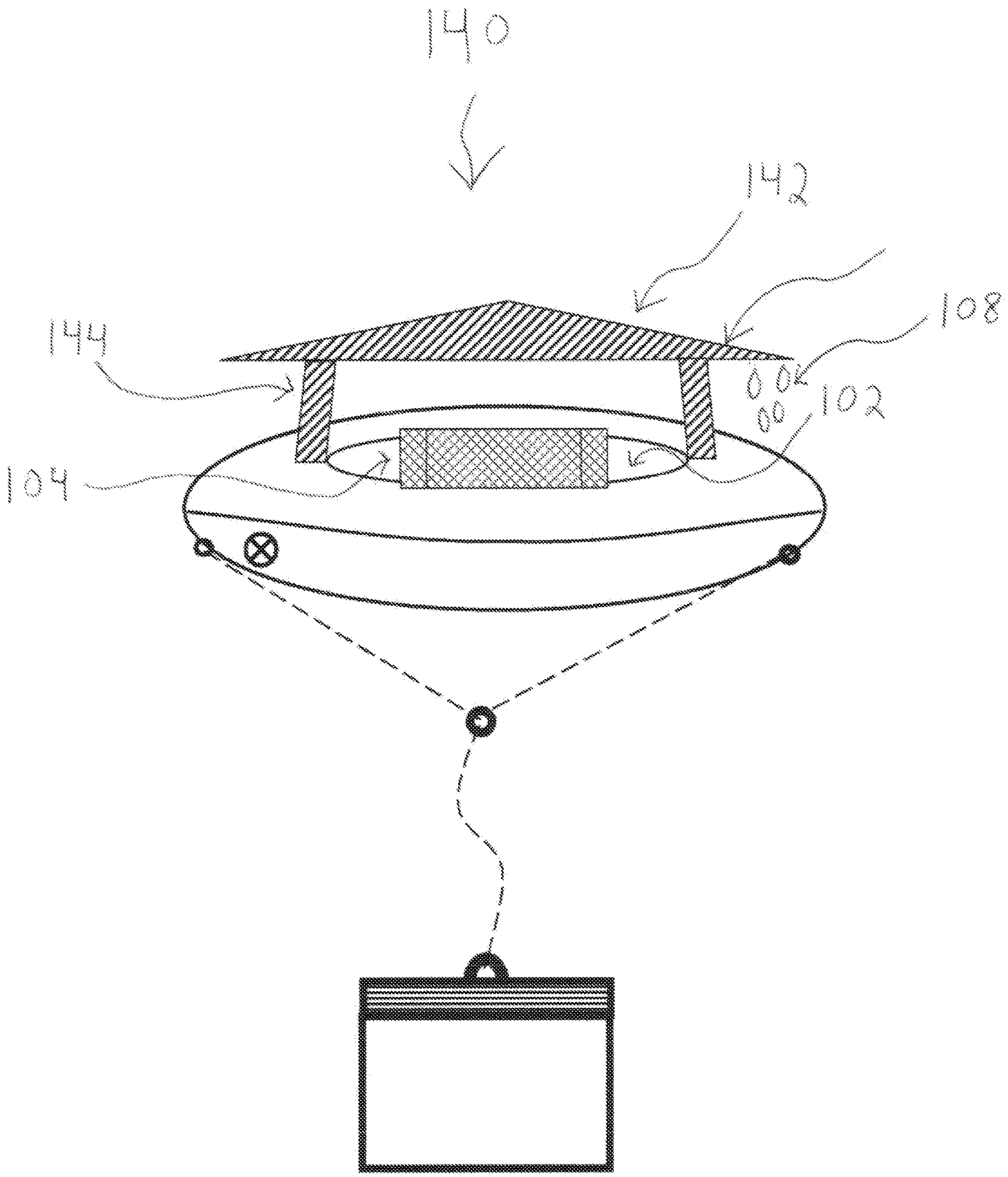
FIG. 5 shows a schematic view of the flotation device of FIG. 1 with an audio device cover, according to an example embodiment of the present disclosure.

FIG. 5 discloses another example embodiment of the flotation device 140 having an audio device cover 142 configured to be similar to a tent or an umbrella positioned over the audio device 104 and the audio device compartment 102. The audio device cover includes at least one support structure 144 that is connected to the flotation device 140 and extents upward from so that the audio device cover is in a raised position from the audio device 104 and the audio device compartment 102. The audio device cover 142 and its support structure 144 may be configured to be an inflatable portion of the flotation device 140 such that all the elements are part of a single inflatable flotation device 140 that takes the form of an embodiment similar to the flotation devices 100, 130, 140 and others described herein. The space between the bottom of the audio device cover and the speaker allows for audio to project out from the sides of the flotation device 140 while still covering the audio device 104 from rain or splashing water. The audio device cover may be configured to extent outward to the center or beyond the center of the flotation device 140 to allow water 108 that may be splashed or falling to run off the ends of the surface of the audio device cover 142 and back into the water 108. The flotation device 140 may include an advertisement and/or branding on a visible exterior of the flotation device 140.

Figure 6:
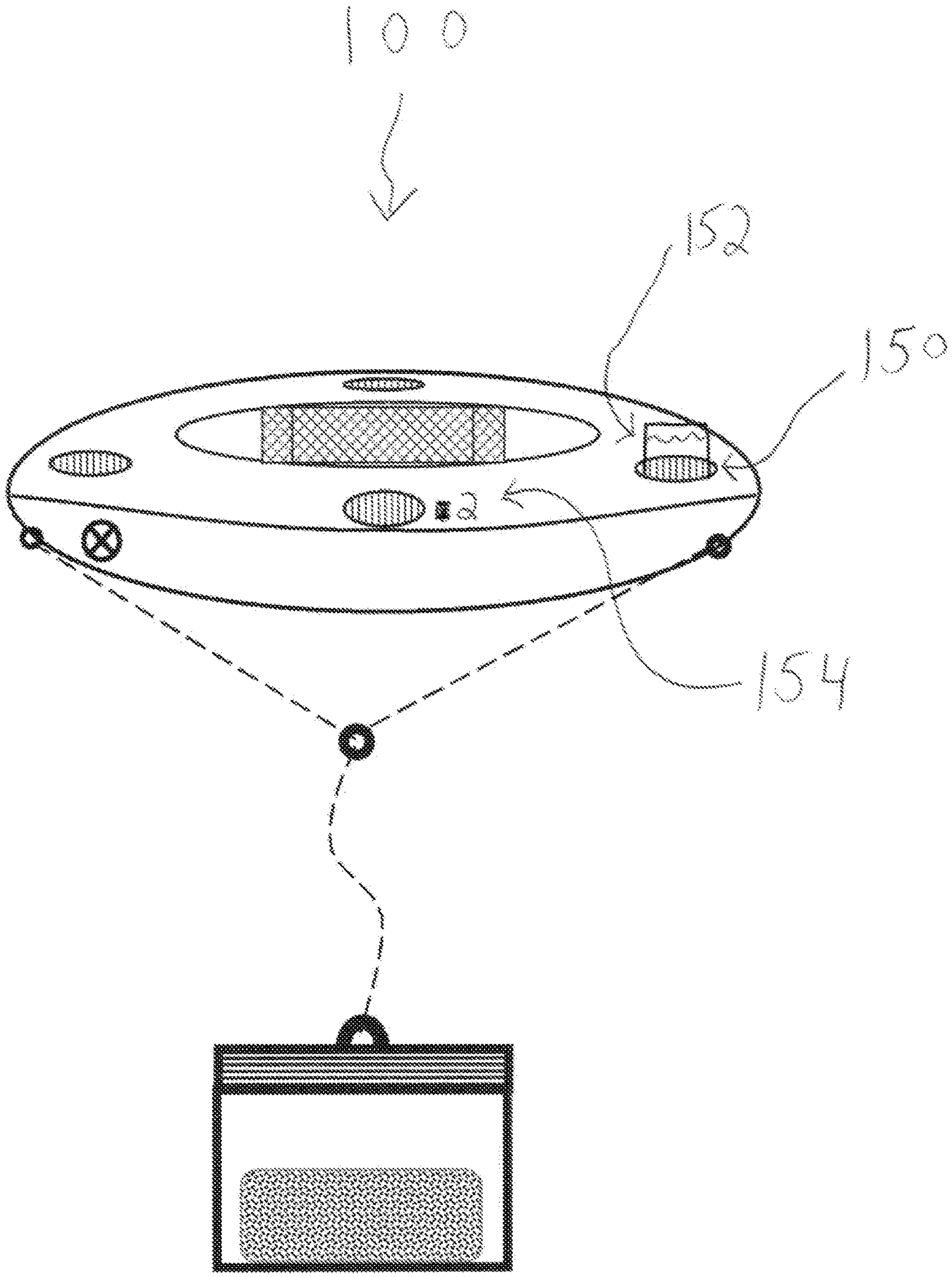
FIG. 6 shows a schematic view of a flotation device with a beverage compartment, according to an example embodiment of the present disclosure.

FIG. 6 discloses another example embodiment of the flotation device 100 according to the invention similar to the flotation device 100 as described in FIG. 1 and may include but not show any one or more of the other features as disclosed in other flotation devices described herein such as an audio device compartment cover. The flotation device 100 includes at least one beverage compartment 150 configured to hold a beverage 152. The at least one beverage compartment 150 may be configured support a beverage 152 that is contained within a beverage cooler or the beverage compartment 150 may comprise a material that can keep a beverage cool for a period of time greater than the beverage 152 not being contained in a beverage cooler. The flotation device 100 may include at least one marking 154 which may be a different color and/or number next to each individual beverage compartment 150 to enable the users of the flotation device 100 to know which beverage 152 is theirs if they leave their beverage 152 to go for a swim or leave the water for a while and then come back to their beverage 152. The flotation device 100 may include an advertisement and/or branding on a visible exterior of the flotation device 100.

Figure 7:
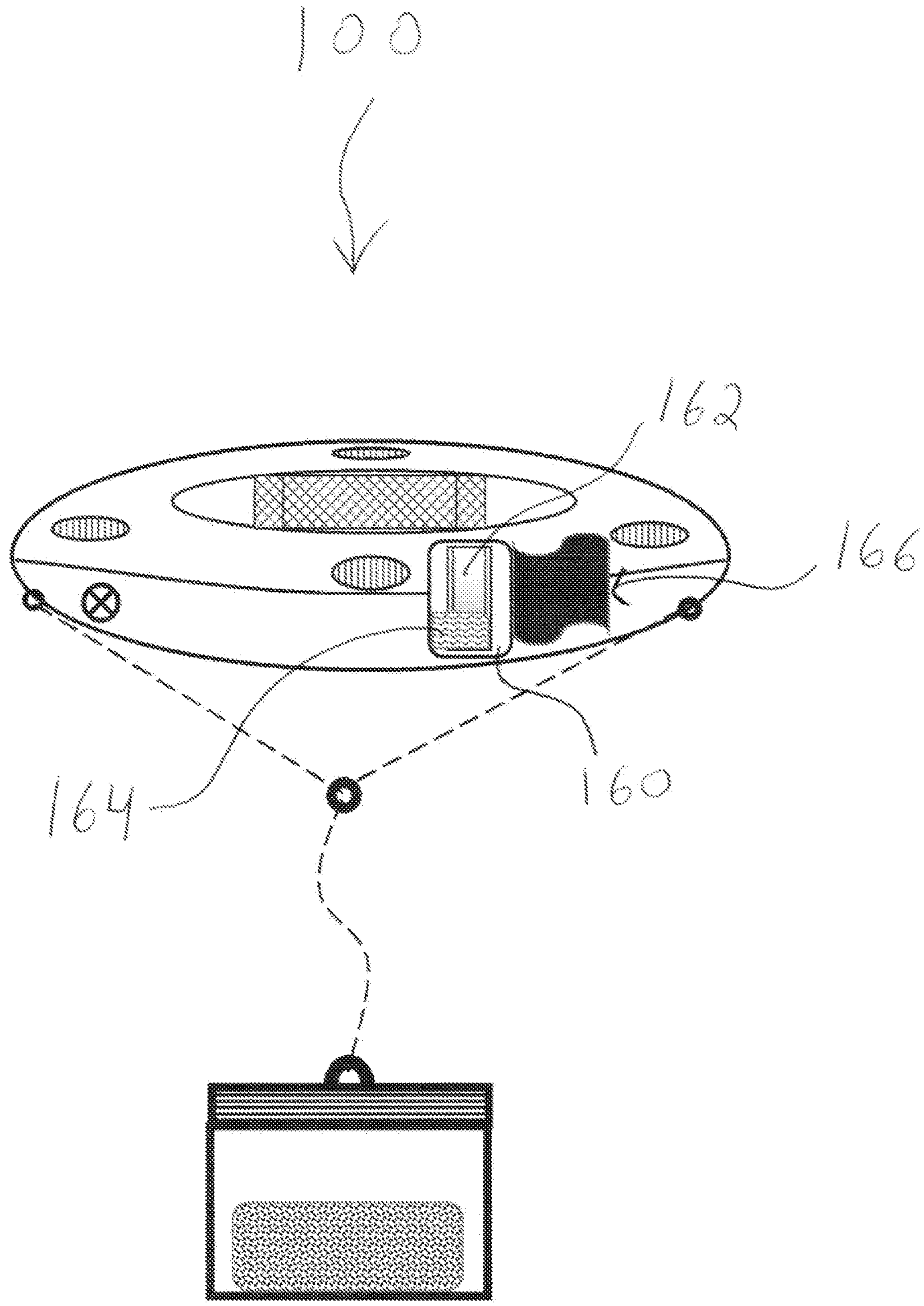
FIG. 7 shows a schematic view of a flotation device with a communication device storage compartment, according to an example embodiment of the present disclosure.

FIG. 7 discloses another example embodiment of the flotation device 100, according to an example embodiment of the present disclosure. In this example embodiment, the flotation device 100 includes at least one communication device storage compartment 160 configured to securely support and/or enclose at least one communication device 162, such as a smartphone. The communication device compartment 160 may include a first cover 164 configured to include a material and/or capability of capacitive touch or other touch enabled technology and/or material that enables a user of the communication device 162 to operate the communication device 162. The communication device compartment 160 may also be water resistant and/or waterproof to protect the communication device 162 from getting wet. The communication device compartment 160 may also be configured to be an integral part of the flotation device 100 including being inflatable along with the flotation device 100 and other inflatable sections and/or components of the flotation device 100. The communication device compartment 160 may also comprise a second cover 166 configured to shield the communication device 162 from heat and/or direct sun exposure when the communication device 162 is not in use and/or being operated by a user. The second cover 166 may be configured to reflect light and/or heat, and/or absorb light and/or heat to reduce the level of heat that reaches the communication device 162 from the sun or ambient temperature. The second cover 166 may be attached to at least one portion of the flotation device 100 and/or the communication device compartment 160 and be configured to be repeatedly removed from and/or positioned over the first cover 164 and/or the communication device 162. The second cover 166 may be connected to and/or integrally formed with the flotation device 100 and may be made of the same or differ type of material. It should be appreciated that any one or more of the audio device covers and/or communication device covers may be inflatable and that the air within the covers may aid in reducing heat from reaching the audio devices and/or communication devices. The flotation device 100 may include an advertisement and/or branding on a visible exterior of the flotation device 100.

Figure 8:
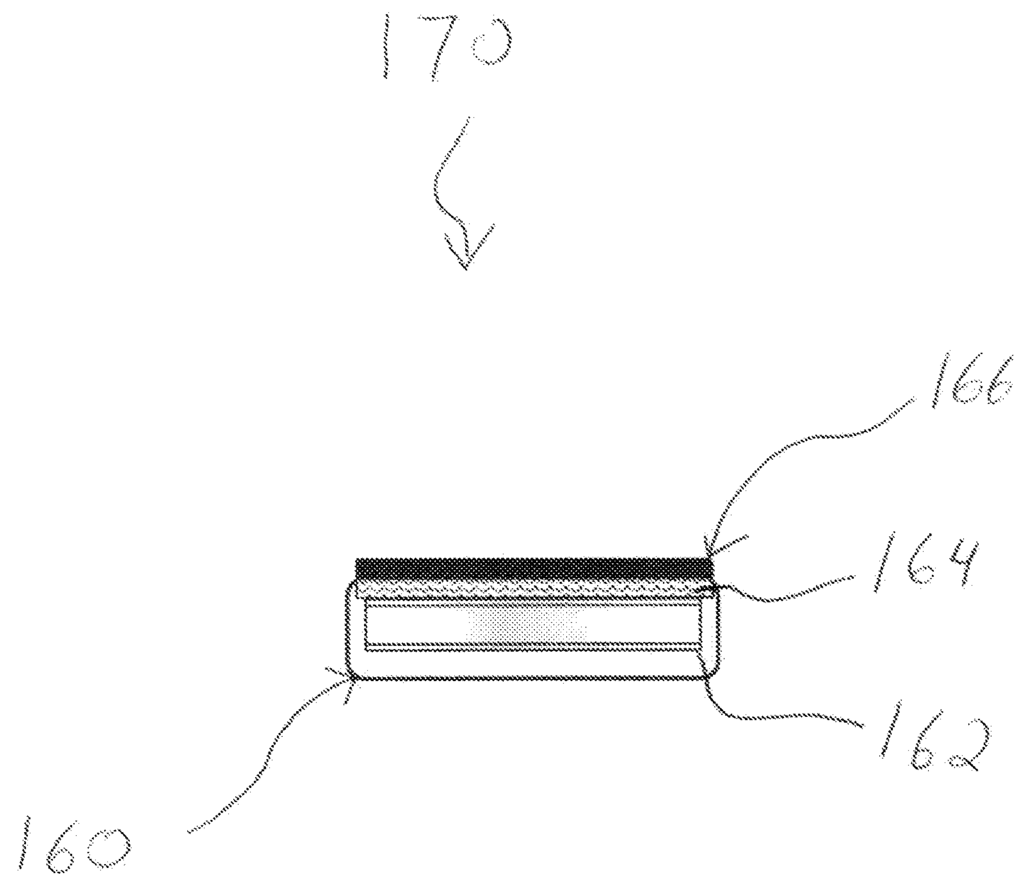
FIG. 8 shows an example cross-section diagram of the communication device compartment of FIG. 7, according to an example embodiment of the present disclosure.

FIG. 8 shows an example cross-section diagram of the communication device compartment 160 as described in FIG. 7. As shown, the communication device 162 is securely supported and/or enclosed in the communication device compartment 160. The communication device compartment 160 may include a first cover 164 configured to include a material and/or capability of capacitive touch or other touch enabled technology and/or material that enables a user of the communication device 162 to operate the communication device 162. The communication device compartment 160 may also be water resistant and/or waterproof to protect the communication device 162 from getting wet. The communication device compartment 160 may also be configured to be an integral part of the flotation device including being inflatable along with the flotation device 100 and other inflatable sections and/or components of the flotation device 100. The communication device compartment 160 may also comprise a second cover 166 configured to shield the communication device 162 from heat and/or direct sun exposure when the communication device 162 is not in use and/or being operated by a user. The second cover 166 may be configured to reflect light and/or heat, and/or absorb light and/or heat to reduce the level of heat that reaches the communication device 162 from the sun or ambient temperature. The second cover 166 may be attached to at least one portion of the flotation device 100 or the communication device compartment and configured to be repeatedly removed from and/or positioned over the first cover 164 and/or the communication device 162. The second cover 166 may be connected to and/or integrally formed with the flotation device 100 and/or the communication device compartment 160, all of which may be made of the same or differ types of materials known to those skilled in the art for achieving the objectives of the design requirements. The flotation device 100 may include an advertisement and/or branding on a visible exterior of the flotation device 100.

Figure 9:
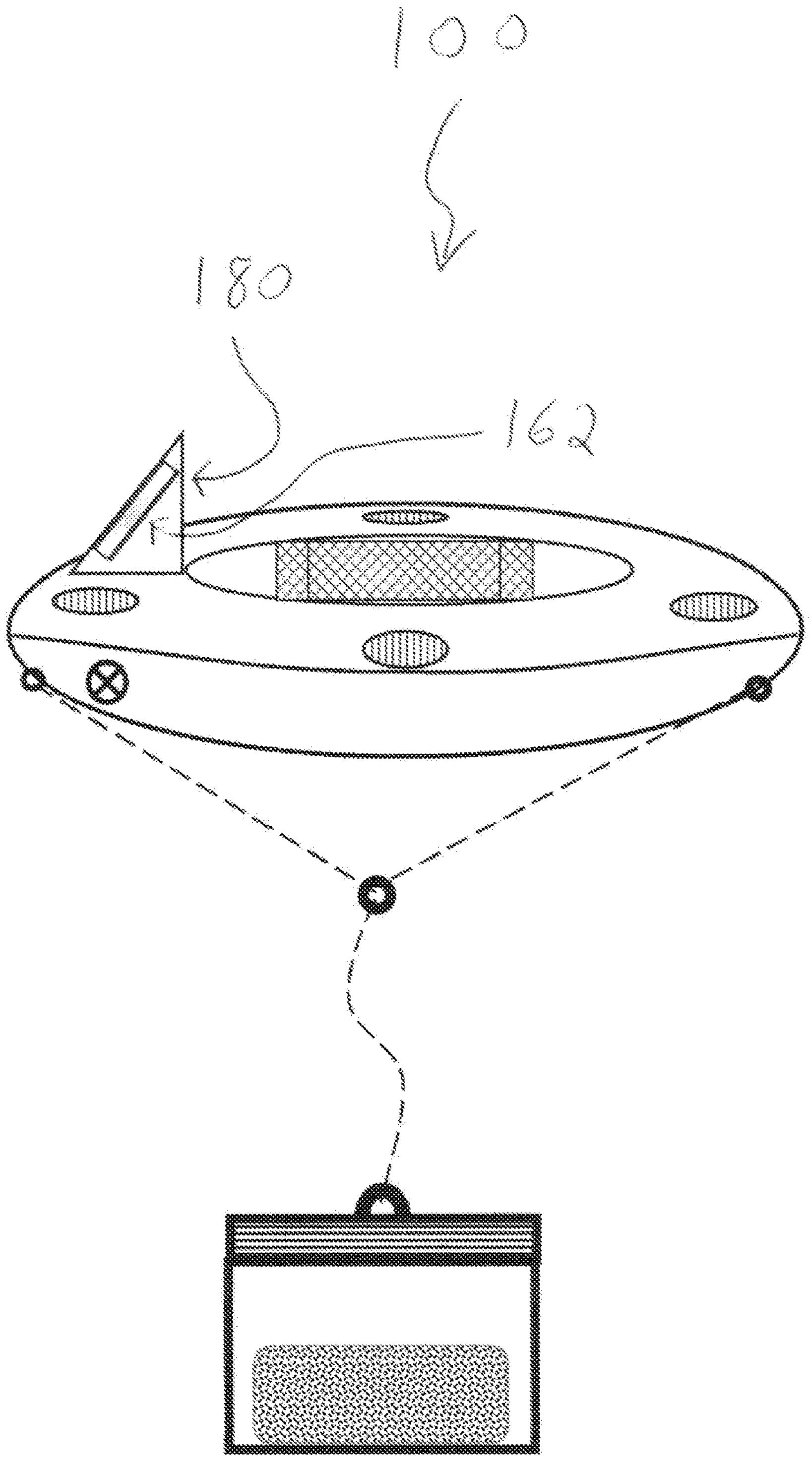
FIG. 9 shows a schematic view of a flotation device with a communication device compartment, according to an example embodiment of the present disclosure.

FIG. 9 discloses another example embodiment of the flotation device 100 according to an example embodiment of the present disclosure. The flotation device 100 includes a communication device compartment 180 configured to secure and/or contain the communication device 162 on an angle that would be facing a user standing in the water next to the flotation device 100. The communication device compartment 180 may be inflated to form the angle when the flotation device 100 is inflated. The communication device compartment 180 may include one or more of the features as described in FIGS. 7 and 8. The flotation device 100 may include an advertisement and/or branding on a visible exterior of the flotation device 100.

Figure 10:
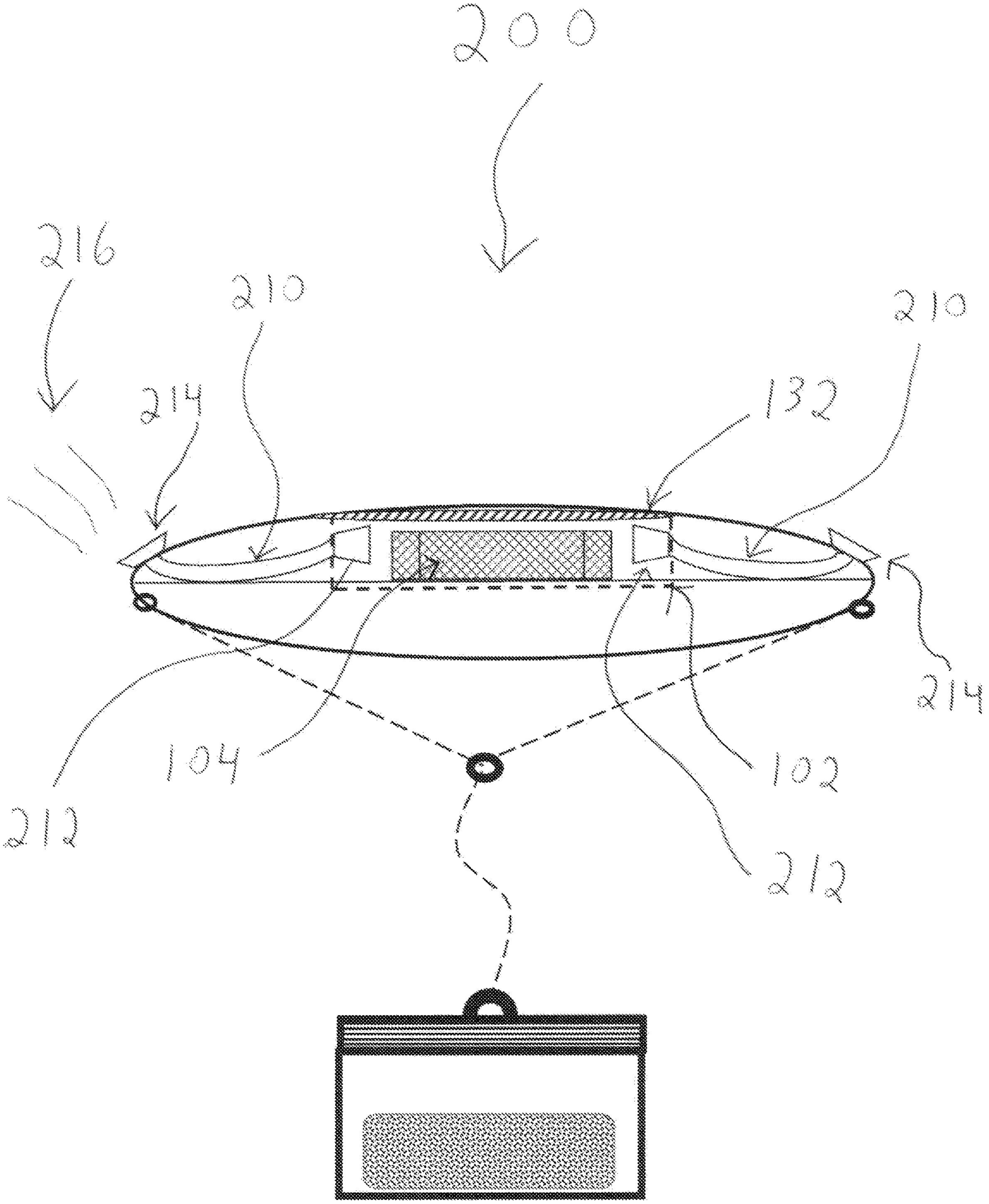
FIG. 10 shows a schematic view of a flotation device with an audio tunnel, according to an example embodiment of the present disclosure.

FIG. 10 discloses another example embodiment of a flotation device 200. FIG. 10 shows a side view of the flotation device 200 including an inside view of a portion of the flotation device 200. The flotation device 200, or more generally, the flotation system comprises the audio device 104 securely contained and sealed inside the audio device compartment 102 and covered with the audio device cover 132. In this example embodiment, the flotation device 200 comprises at least one audio tunnel 210 extending from the inside of the audio device compartment 102 to the outside of the flotation device 200. The at least one audio tunnel 210 is substantially hollow and may be configured into somewhat of an "S" shape or "U" shape to prevent water from flowing into the audio device compartment 102. The at least one audio tunnel 210 includes one receiving end 212 configured to receive an audio input from the at least one audio device 104 and at least one output end 214 configured to emit audio waves 216 outward from the flotation device 200 and towards a user standing near the flotation device 200. It is contemplated that the at least one output end 214 of the at least one audio device tunnel 210 may be located near a beverage compartment and/or communication device compartment of the flotation device. It is further contemplated that as many as each individual beverage compartment and/or communication device compartment may have an audio output end 214 in close proximity so each user of a beverage compartment and/or communication device would have better quality audio directed to them while. The flotation device 200 may include an advertisement and/or branding on a visible exterior of the flotation device 200.

Figure 11:
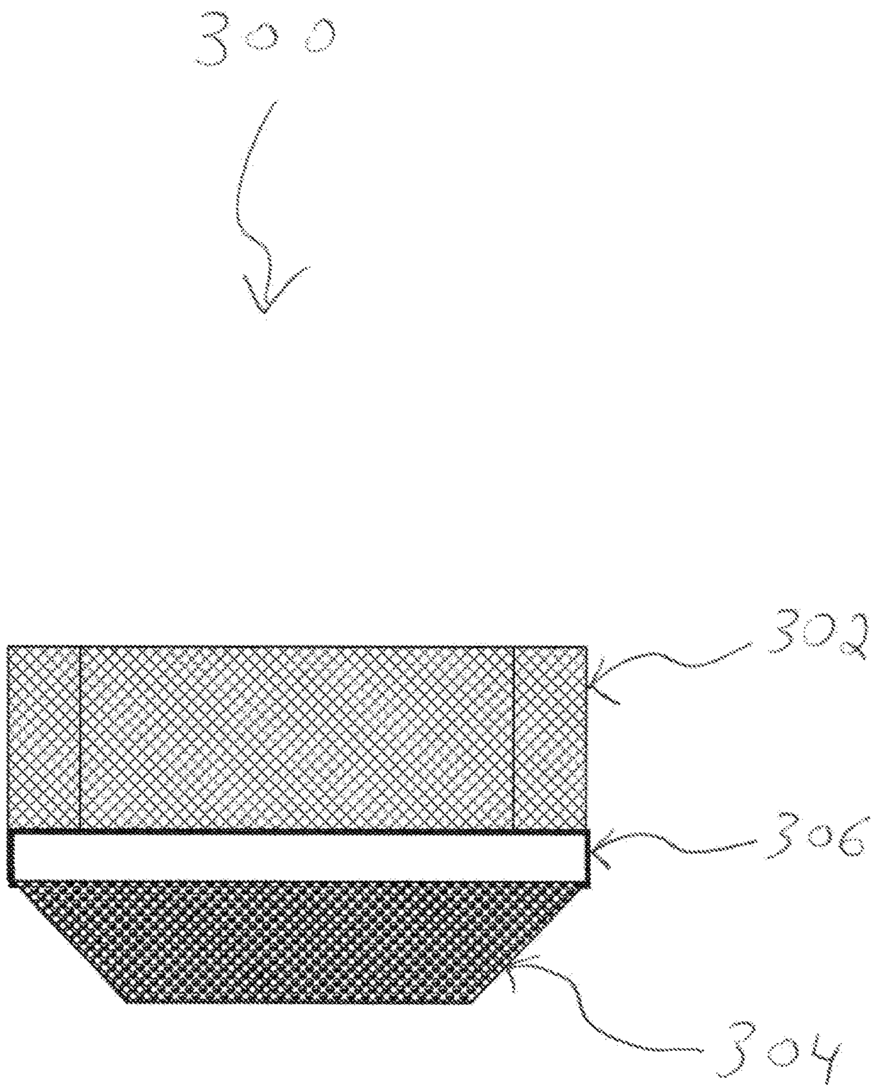
FIG. 11 shows a schematic view of an audio device that is configured to contain a partially or completely removable inflatable flotation device within its housing, according to an example embodiment of the present disclosure.
Figure 12:
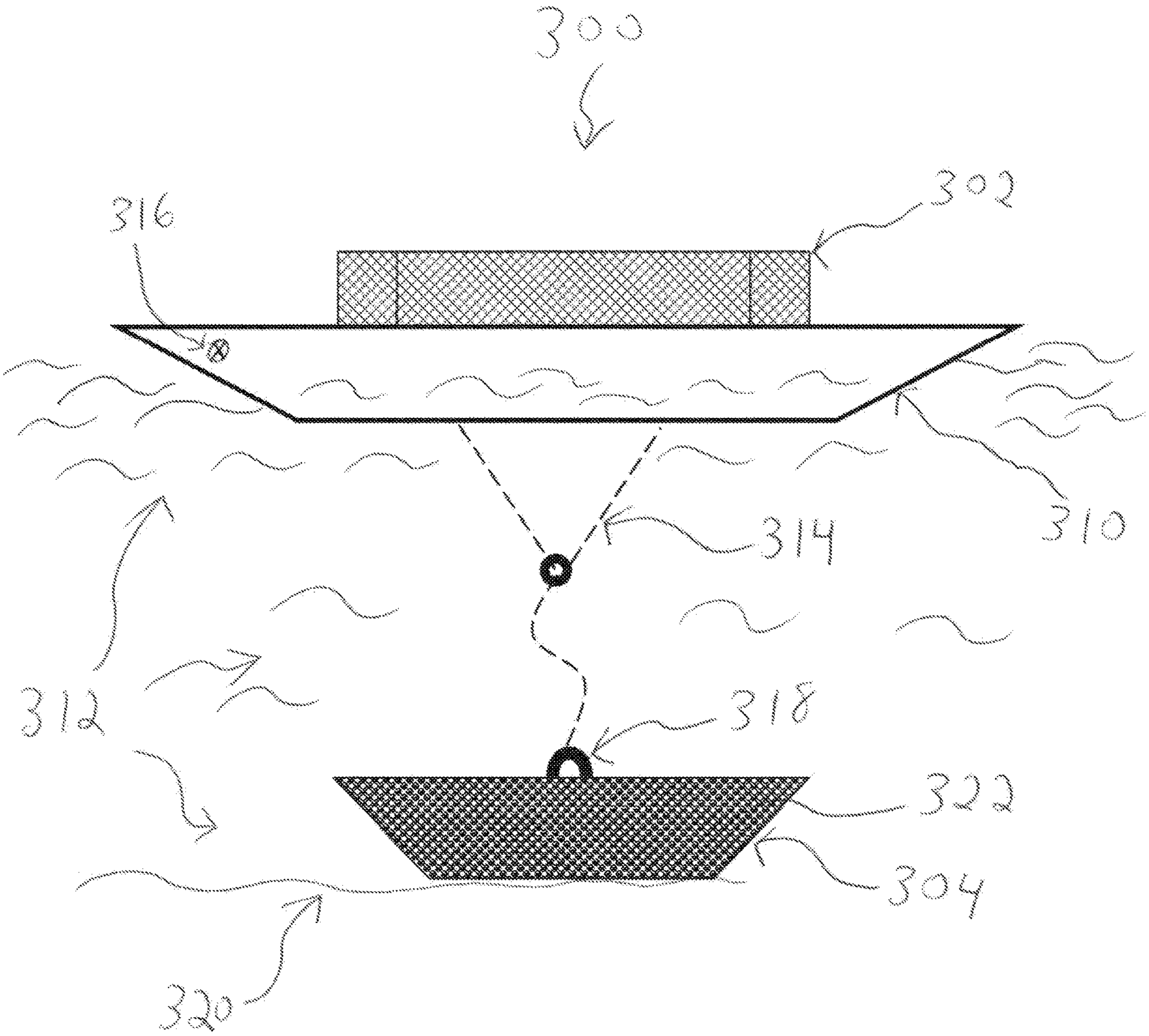
FIG. 12 shows a schematic view of the audio device of FIG. 11 with the flotation device inflated, according to an example embodiment of the present disclosure.

FIG. 11 discloses an example embodiment of a floating audio device 300, which may be a portable radio and/or a portable wireless speaker ("audio device") that is configured to contain a partially or completely removable inflatable flotation device within its housing to enable the audio device to be supported by the flotation device and float in water. The floating audio device 300 comprises an audio device speaker portion 302 configured to provide audio output from the audio device and a removable anchoring portion 304 that is configured to be removable and connected and/or connectable to at least one section of the floating audio device 300 via a line 314, as shown in FIG. 12. The floating audio device 300 also comprises a flotation device compartment 306 configured to contain an inflatable flotation device, as shown in FIG. 12. The flotation device compartment 306 may comprise a buoyant material such as a foam and/or Styrofoam in place of the inflatable flotation device and the buoyant material be completely and/or partially integrated within the audio device. The floating audio device 300 may include an advertisement and/or branding on a visible exterior of the floating audio device 300.

FIG. 12 discloses another example embodiment of the floating audio device 300 as shown in FIG. 11. In this embodiment, the flotation device 310 is inflated and surrounding and supporting the audio device speaker portion 302 on the surface of water 312. As described in FIG. 11, the audio device comprises a flotation device compartment 306 (not shown) configured to contain the inflatable flotation device 310. The compartment 306 is configured to open so that the inflatable flotation device 310 can be partially and or completely removed from the compartment 306 when a user wishes to use the audio device as a floating audio device and then stored when the user wishes to use the audio device on land. A portion of the flotation device 310 may be permanently connected to the compartment 306. The floating audio device 300 comprises a speaker portion 302 configured to provide audio output from the floating audio device 300 and a removable anchoring portion 304 that is configured to be removable and connected and/or connectable to at least one section of the floating audio device 300 and/or the flotation device 310 via at least one line 314. The flotation device 310 may include an air valve 316 configured for allowing air to be inserted and removed into the flotation device 310 for inflating and deflating the flotation device 310. The flotation device 310 is configured to float in water similar to other flotation devices known in the art. The at least one line 314 is configured to be securely connected to both the anchor 304 and at least one floating portion of the floating audio device 300. The anchor 304 comprises at least one anchor connection point 318 for connecting the line 314 to the anchor 304 and at least one floating portion of the floating audio device 300. The length of the line 314 is configured to be a length that may be adjustable in length and secured to a fixed length position and allows the anchor 304 to sit on the bottom and/or floor 320 of a water body while allowing the audio device speaker portion 302 and the floating audio device 300 to float on the surface of the water 312 in a reasonably stationary location, thereby allowing one or more people to congregate near and around the floating audio device 300 and not need to hold it in place while listening to music and/or other audio entertainment projecting from the audio device speaker portion 302. The line 314 may be configured to be removable from at least one of the floating audio device 300 and/or the anchor 304, or the line 314 may be configured to be fixed and not removable from at least one of the one section of the floating audio device 300, the flotation device 310, and/or the anchor 304. The anchor 304 may be configured to be made of a solid material to provide sufficient weight needed to secure the floating audio device 300 in place. It is more preferable that the anchor 304 is a light weight material and configured to be in the form of a container comprising at least one removable lid (not shown) to allow the anchor 304 to be filled with sand, rock or other weighting material 322 within that is sufficiently heavy enough to secure the anchor 304 in place at the bottom of a water body 320. It is contemplated that the anchor 304 may also be configured to store a flotation device and/or the line 314 and that the flotation device 310 may comprise at least one compartment configured to securely contain at least one communication device and/or at least one beverage similar to the compartments described herein for other flotation devices. The main difference in this embodiment is that the floating audio device 300 has a built in inflatable flotation device 310 to enable a user to take it into the water. It is further contemplated that such a floating audio device 300 may comprise a section of its structure and/or housing that can be submerged and be waterproof while another section of the floating audio device 300 such as the section that emits audio would be above water when floating. The floating audio device and/or flotation device 310 may further comprise any one or more of the types of covers for the floating audio device 300 and/or communication device (not shown) as described herein for other flotation devices. The floating audio device 300 may include an advertisement and/or branding on a visible exterior of the floating audio device 300

Figure 13:
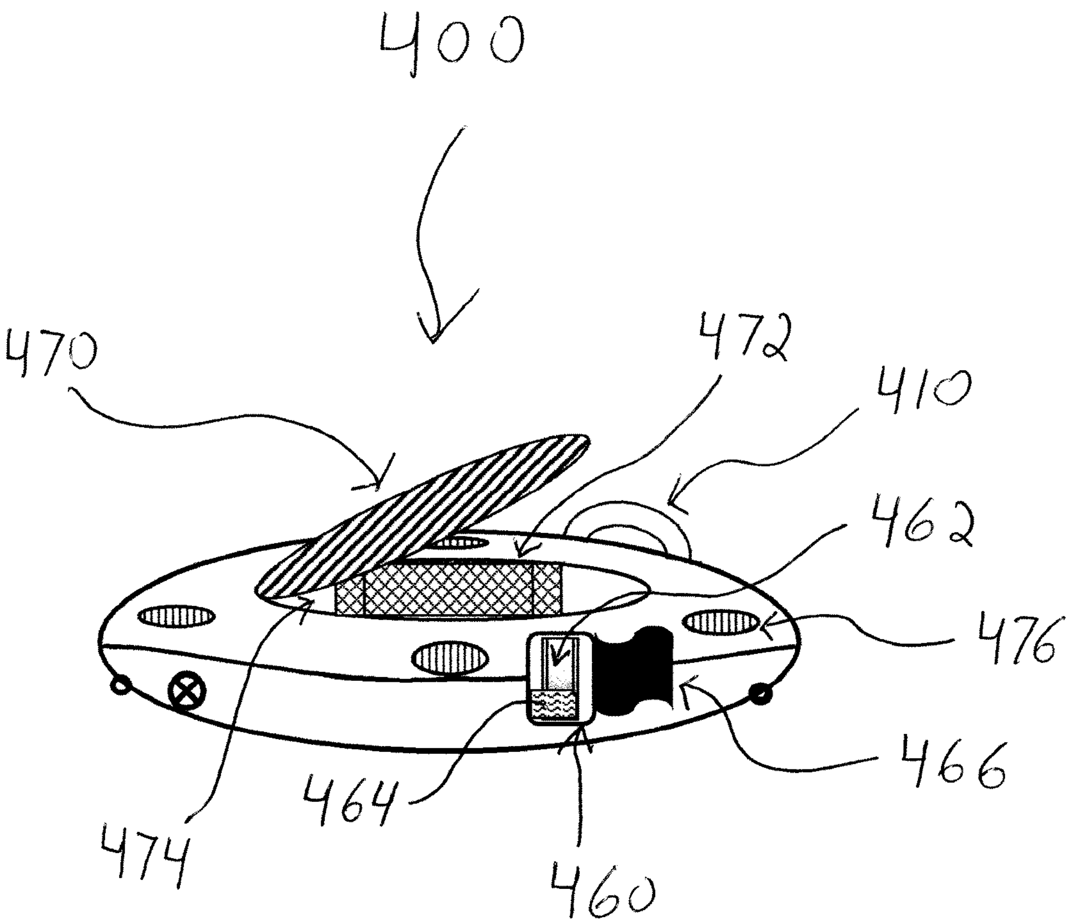
FIG. 13 shows a schematic view of another flotation device, according to an example embodiment of the present disclosure.

FIG. 13 discloses another example embodiment of the flotation device 400. It should be appreciated that although the anchor provides a valuable benefit to a person using the flotation device, a flotation device could be provided without the anchor while still including one or more of the other features of such a flotation device and other potential features, as those shown in flotation device 400 which does not show an anchor but may be configured to include and/or connect to an anchor. In this example embodiment, the flotation device 400 includes at least one handle 410 configured for a user to grab and/or hold on to. The user may use the handle 410 for a variety of things including but not limited to pulling and/or pushing and/or repositioning the flotation device 400 into a desired location in the water. The handle may be made of one of more materials known to those skilled in the art of flotation devices and similar to those used to make handles on existing flotation devices. In this example embodiment, flotation device 400 includes at least one communication device storage compartment 460 configured to securely support and/or enclose at least one communication device 462 as described herein such as a smartphone. The communication device compartment 460 may include a first cover 464 configured to include a material and/or capability of capacitive touch or other touch enabled technology and/or material that allows a user of the communication device 462 to operate the communication device 462. The communication device compartment 460 may also be water resistant and/or waterproof to protect the communication device 462 from getting wet. The communication device compartment 460 may also be configured to be an integral part of the flotation device including being inflatable along with the flotation device 400 and other inflatable sections and/or components of the flotation device 400. The communication device compartment 460 may also comprise a second cover 466 configured to shield the communication device from heat and/or direct sun exposure when the communication device 462 is not in use and/or being operated by a user. The second cover 466 may be configured to reflect light and/or heat, and/or absorb light and/or heat to reduce the level of heat that reaches the communication device 462 from the sun or ambient temperature. The second cover 466 may be attached to at least one portion of the flotation device 400 and/or the communication device compartment 460 and configured to be repeatedly removed from and/or positioned over the first cover 464 and/or the communication device 462. The second cover 466 may be connected to and/or an integral part of the flotation device 400 and may be made of the same or differ type of material. The flotation device 400 further may include at least one cover 470 configured to cover and/or enclose the audio device 472 into the audio device compartment 474. The flotation device 400 also includes at least one beverage compartment 475 similar to those described herein. It should be appreciated that the cover 470 could be configured to allow for sufficient volume and quality of audio to be heard from the audio device 472 through the cover 470 when the audio device 472 is enclosed inside the audio device compartment 474 and the cover 470 is closed. It should be appreciated that the audio device compartment 474 may be configured to also contain the at least one communication device 462 and eliminate the need for a separate communication device compartment 460. It should also be appreciated that at least one portion of the at least one cover 470 for the audio device compartment 474 may be configured to function similar to a speaker diaphragm to improve the quality of the audio output from the audio device 472 when the cover is closed. In some instances, any one or more of the audio device covers and/or communication device covers may be inflatable and that the air within the covers may aid in reducing heat from reaching the audio devices and/or communication devices. The flotation device 400 may include an advertisement and/or branding on a visible exterior of the flotation device 400. It should be appreciated that the materials used to manufacture the floating audio device and/or the flotation device may be materials known to those skilled in the to achieve the quality and objective of each component of the flotation device 400 including but not limited to a cover, a compartment, a container, an anchor, a line, the lid and/or any other component and/or materials needed to provide a durable and good quality product. Any portable audio device and/or portable communication device may comprise a rechargeable battery, an antenna, a transceiver, at least one LED which may be an OLED or a laser, an audio speaker and in some cases a video display.

Figure 14:
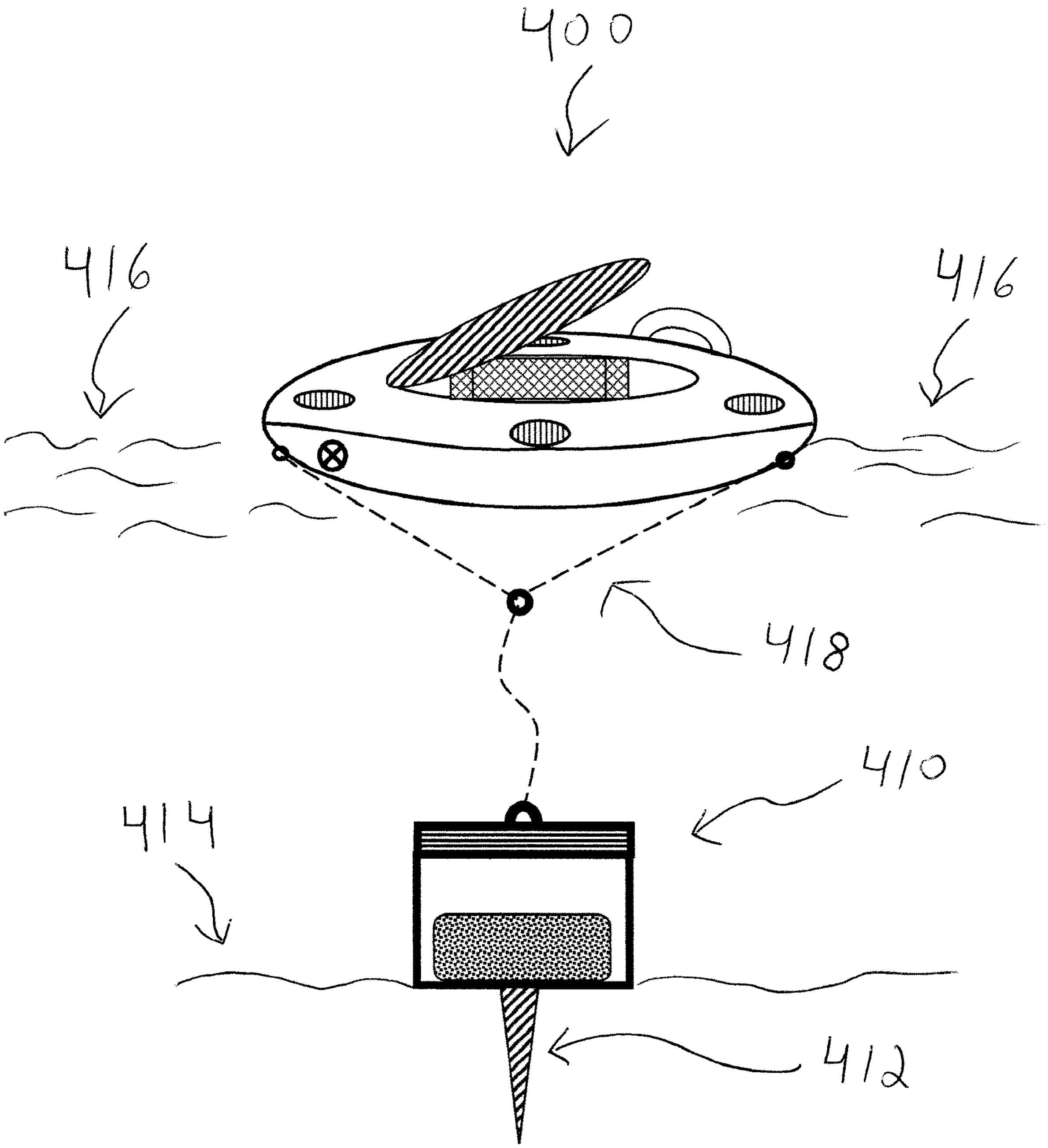
FIG. 14 shows a schematic view of a flotation device connected to an anchor including a spike, according to an example embodiment of the present disclosure.

FIG. 14 discloses another example embodiment of the flotation device 400. In this example embodiment, the anchor 410 includes a spike 412 at the bottom of the anchor 410. The spike 412 is configured to be pushed into the floor 414 of the water body 416 to aid the anchor 410 in being able to stay secured in position. It should be appreciated that the spike 412 alone may be provided and sufficient enough to hold the flotation device 400 in a reasonably stationary location on the surface of the water body 416 and no anchor 410 would be needed. Therefor the spike 412 may be connected direct to the line 418 that is connected to the flotation device 400.

Figure 15:
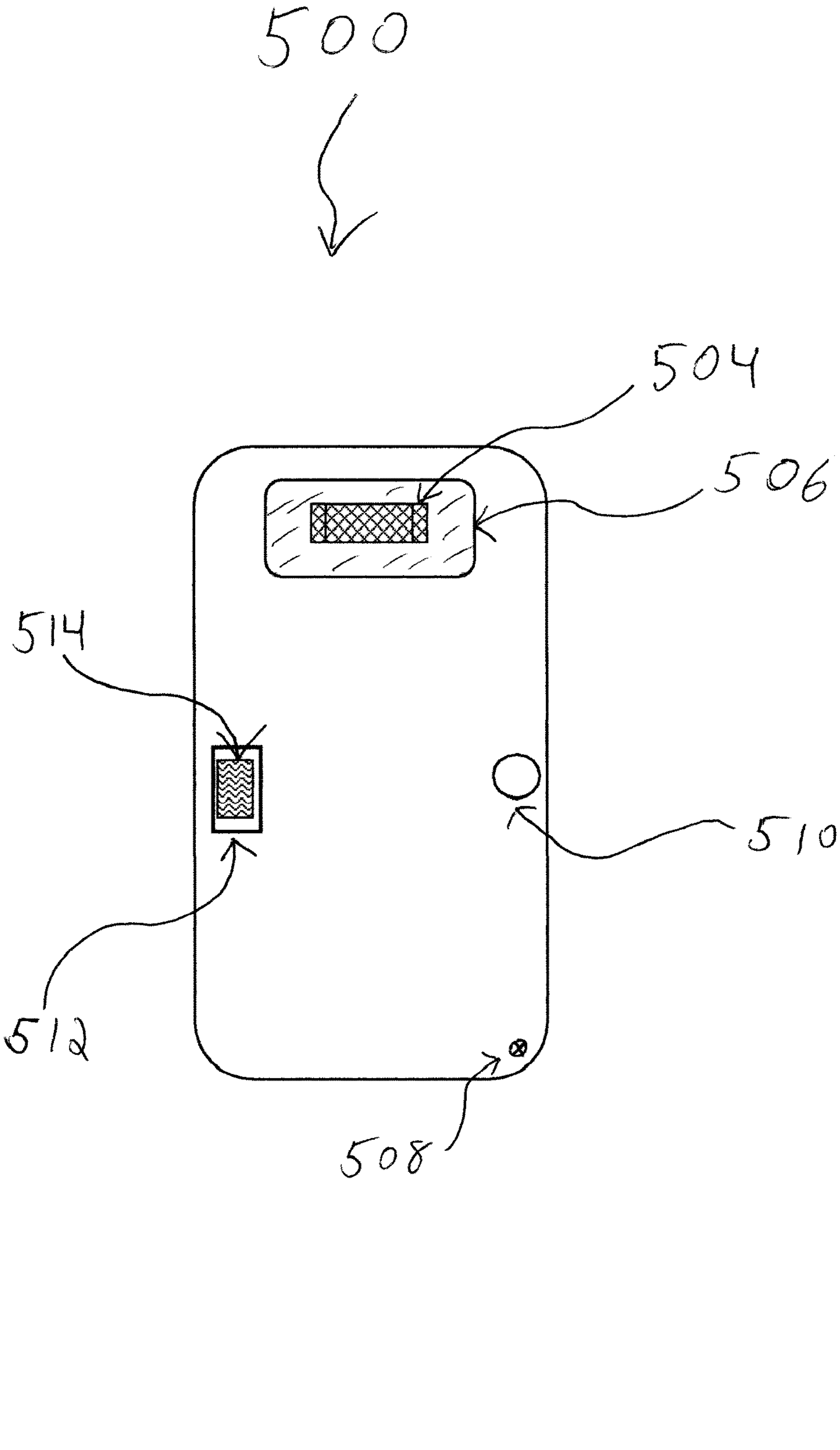
FIGS. 15 to 17 show schematic views of a flotation device that can support a person, according to example embodiments of the present disclosure.
Figure 16:
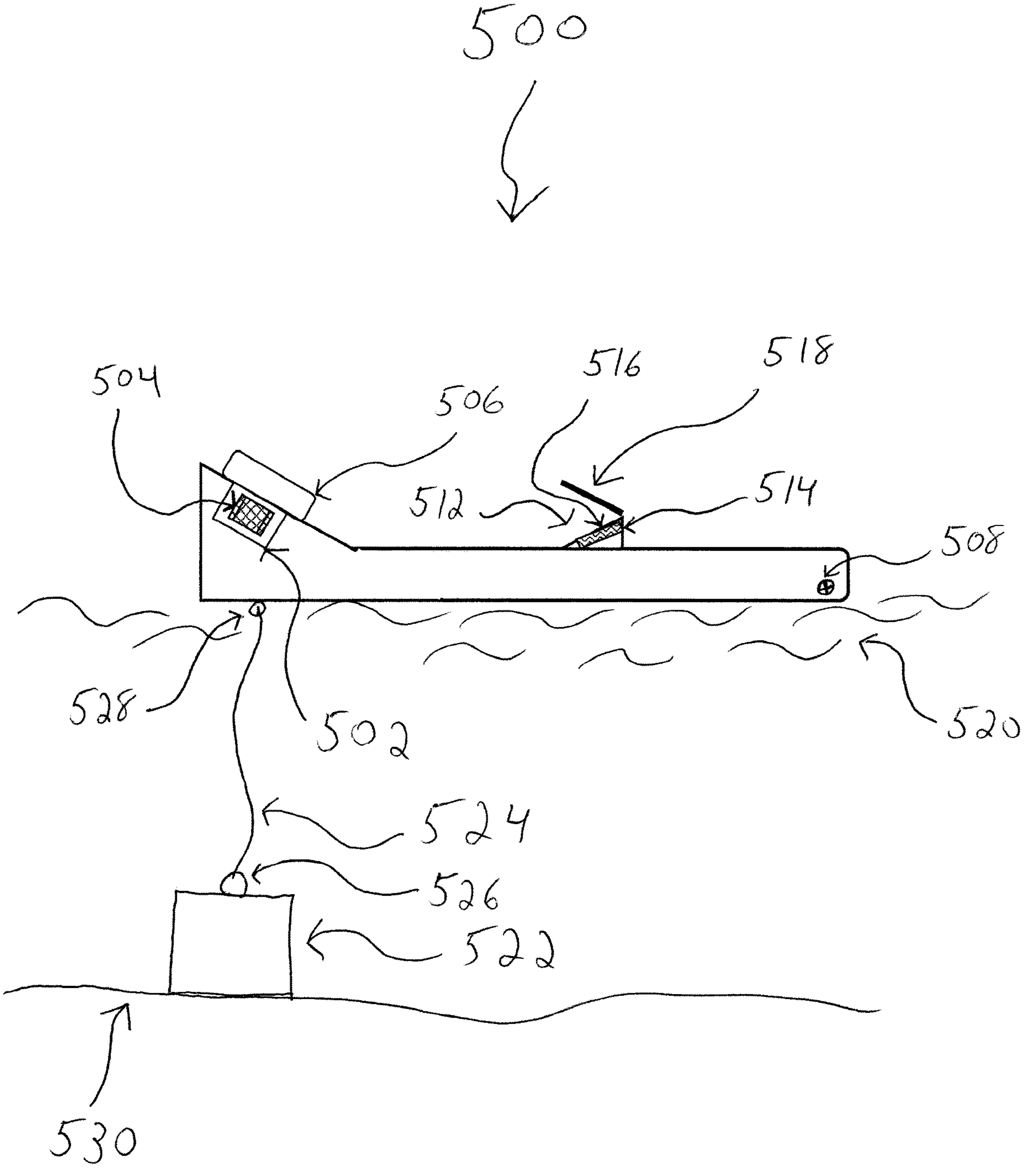

FIG. 15 discloses another example embodiment of a flotation device 500. In this embodiment, the flotation device 500 is configured to be a raft that can support at least one person and may be configured to include one or more of the same features as described in the previous figures and embodiments of flotation devices herein. The flotation device 500 includes at least one audio device compartment 502 (as shown in FIG. 16) positioned within, beneath, and/or near a headrest 506 and configured to secure and/or contain at least one audio device 504 that may be inserted and/removed from the compartment 502. The flotation device 500 may be configured to be an inflatable flotation device 500 similar to existing inner tubes, rafts, and other flotation devices used for water activities in a pool, a lake, an ocean, a river, or other body of water where people can swim. The flotation device 500 may include an air valve 508 configured for allowing air to be inserted and removed into the flotation device 500 for inflating and deflating the flotation device 500. The flotation device 500 may include at least one beverage compartment 510 configured to securely support and/or contain at least one beverage. The at least one beverage compartment 510 may be configured to include a cover and sufficient thermal insulation to function as a cooler and keep the at least one beverage cool and optionally may contain ice. The at least one flotation device 500 may be configured to include at least one communication device compartment 512 configured to securely support and/or contain at least one communication device 514.

FIG. 16 discloses a side view example embodiment of the flotation device 500. The flotation device 500 includes at least one audio device compartment 502 positioned within, beneath and/or near a headrest 506 for a person and configured to secure and/or contain at least one audio device 504 that may be inserted and/removed from the compartment 502. The headrest 506 may be configured to be a pillow. The headrest 506 may be configured to be a cover for the audio device compartment 502. The flotation device 500 may be configured to be an inflatable flotation device 500 similar to existing inner tubes, rafts and other flotation devices used for water activities in a pool, a lake, an ocean, a river or other body of water where people can swim. The flotation device 500 may include an air valve 508 configured for allowing air to be inserted and removed into the flotation device 500 for inflating and deflating the flotation device 500. The flotation device 500 may include at least one beverage compartment 510 as shown in FIG. 15 configured to securely support and/or contain at least one beverage. The at least one beverage compartment 510 may be configured to include a cover and sufficient thermal insulation to function as a cooler and keep the at least one beverage cool and optionally may contain ice.

The at least one flotation device 500 may be configured to include at least one communication device compartment 512 that is configured to securely support and/or contain at least one communication device 514. The communication device compartment 512 may be angled towards the face and/or eyes of a person laying on the headrest 506 and/or flotation device 500. The communication device compartment 512 may include a first cover 516 configured to include a material and/or capability of capacitive touch or other touch enabled technology and/or material that allows a user of the communication device 514 to operate the communication device 514. The communication device compartment 512 may also be water resistant and/or waterproof to protect the communication device 514 from getting wet. The communication device compartment 512 may also be configured to be an integral part of the flotation device including being inflatable along with the flotation device 500 and other inflatable sections and/or components of the flotation device 500. The communication device compartment 512 may also comprise a second cover 518 configured to shield the communication device from heat and/or direct sun exposure when the communication device 514 is not in use and/or being operated by a user. The second cover 518 may be configured to reflect light and/or heat, and/or absorb light and/or heat to reduce the level of heat that reaches the communication device 514 from the sun or ambient temperature. The second cover 518 may be attached to at least one portion of the flotation device 500 and/or the communication device compartment 512 and configured to be repeatedly removed from and/or positioned over the first cover 516 and/or the communication device 514. The second cover 518 may be connected to and/or an integral part of the flotation device 500 and may be made of the same or differ type of material. It should be appreciated that any one or more of the audio device covers and/or communication device covers may be inflatable and that the air within the covers may aid in reducing heat from reaching the audio devices and/or communication devices. The flotation device 500 may include an advertisement and/or branding on a visible exterior of the flotation device 500. The flotation device 500 is configured to float in water 520 similar to other flotation devices known in the art and other embodiments as described herein. The flotation device 500 may be configured to include and/or be connected to at least one anchor 522 that is securely connected to the flotation device 500 via at least one line 524. The at least one line 524 is configured to be securely connected to both the flotation device 500 and the anchor 522. The anchor 522 comprises at least one anchor connection point 526 for connecting the line 524 to the anchor 522 and the flotation device 500 comprises at least one flotation device connection point 528 for connecting the line 524 to the flotation device 500. The length of the line 524 is configured to be a length that may be adjustable in length and secured to a fixed length position and allows the anchor 522 to sit on the bottom and/or floor 530 of a body of water while allowing the flotation device 500 to float on the surface of the body of water 520 in a reasonably stationary location thereby allowing the one or more persons on the flotation device 500 to not drift away. The anchor may be configured to be similar to the anchors and/or anchoring devices described herein for other flotation device embodiments.

Figure 17:
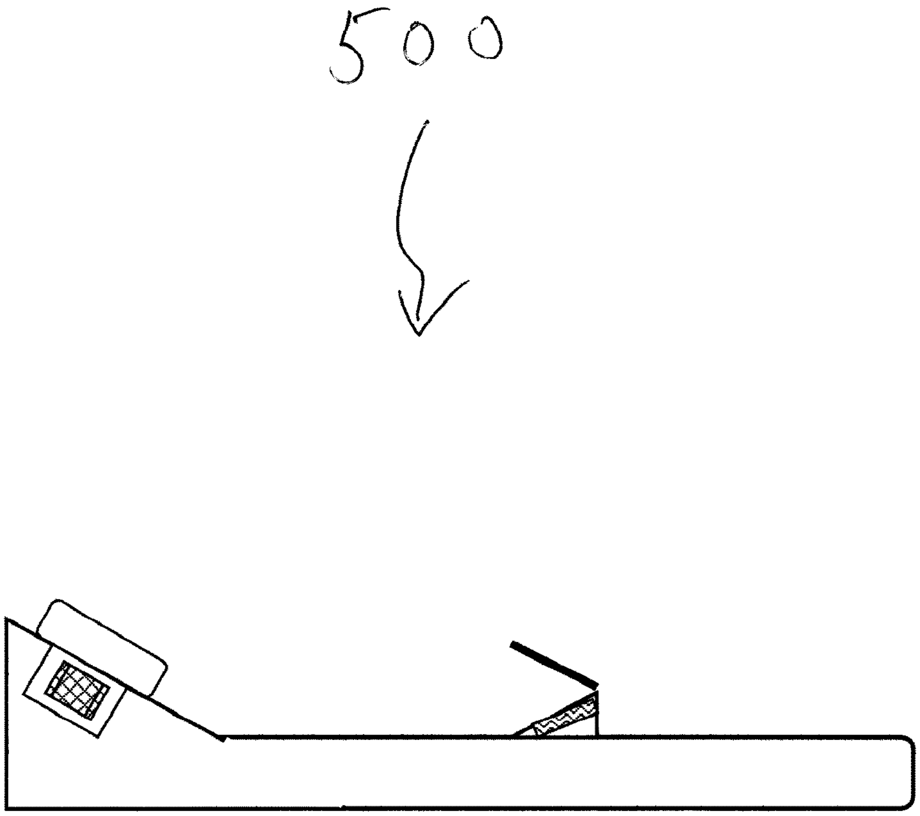

FIG. 17 discloses a side view of the same example embodiment of the flotation device 500 according to the disclosure as described in conjunction with FIGS. 15 and 16 and configured to be a raft that can support at least one person to sit on and/or lay down on.

Figure 18:
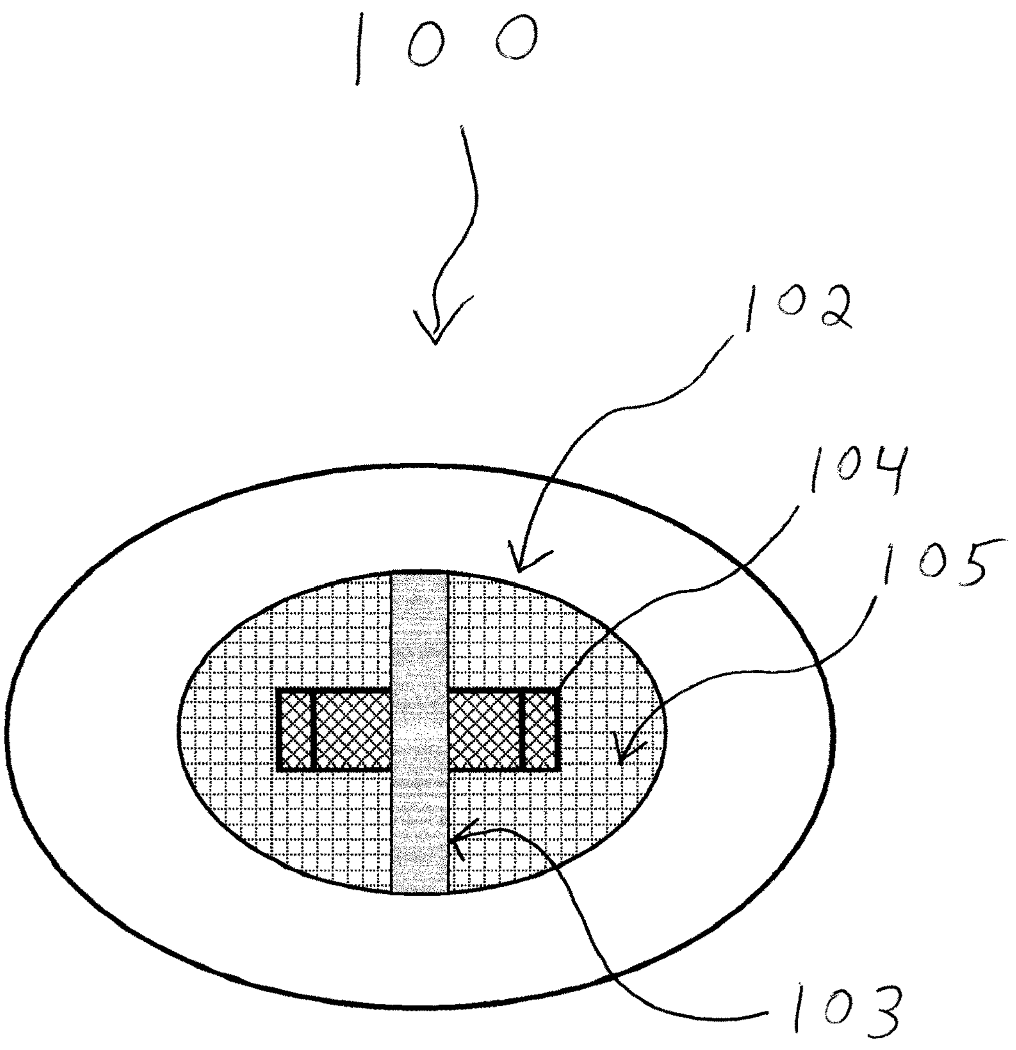
FIG. 18 shows a schematic view of a flotation device configured to include a compartment bottom with drain holes and a securing device, according to an example embodiment of the present disclosure.

FIG. 18 discloses a top view looking down on another example embodiment of the flotation device 100 according to the invention similar to the flotation device 100 as described in FIG. 1 (without showing a view of the anchor beneath the flotation device 100) and may include, but not show, any one or more of the other features as disclosed in other flotation devices described herein. The flotation device 100 includes at least one audio device compartment 102 configured to secure and/or contain at least one audio device 104 that may be inserted and/removed from the compartment 102. In some embodiments, the audio device 104 may also include a video screen, such as a television. The compartment 102 may be configured to include a compartment bottom and/or floor 105, which may be configured to drain water. The compartment bottom and/or floor 105 may be made of a mesh material for allowing water to drain. The compartment bottom and/or floor 105 may further be configured to be a mesh material that can be stretched in at least one direction. The compartment bottom and/or floor 105 may further be configured to sit above water. The compartment bottom and/or floor 105 may further be configured to sit above water, which preferably is configured to sit one inch or more above water when the at least one audio device 104 is placed in the compartment and adds weight to the floor 105.

The flotation device 100 may be configured to include at least one securing device 103 and/or connection point (e.g., a securing device) for at least the audio device 104 (but could be configured to secure other devices such as a communication device) such as at least one of a clip, a hook, a grommet and/or ring, a strap, or a stretchable material such as elastic or rubber that may be an integrated part of and/or connected to the flotation device 100 and/or a part of the flotation device 100 and positioned over at least a portion of the compartment 102 and/or the compartment floor 105 such that at least one of at least one audio device 104 and/or at least one communication device may be connected to the securing device 103 or held by the securing device 103 when the audio device 104 and/or communication device is placed under the securing device 103 such as a strap and/or stretchable material and/or between the securing device 103 stretchable material and the floor 105 to secure in place the at least one audio device 104 and/or at least one communication device within the compartment 102. The securing device 103 may be configured to be made of the same material as the floor 105. The securing device 103 may be configured to be connected to the floor 105 such that together they form a pocket or tight location for securing the audio device 104. The securing device 103 (such as an elastic band or mesh material) may be configured to allow a reasonable amount of audio to pass through the material when placed over the audio device 104. The securing device 103 may be configured to be connect to the floor 105 of the flotation device 100. Alternatively, the securing device 103 may be configured to connect to another part of the flotation device 100.

Figure 19:
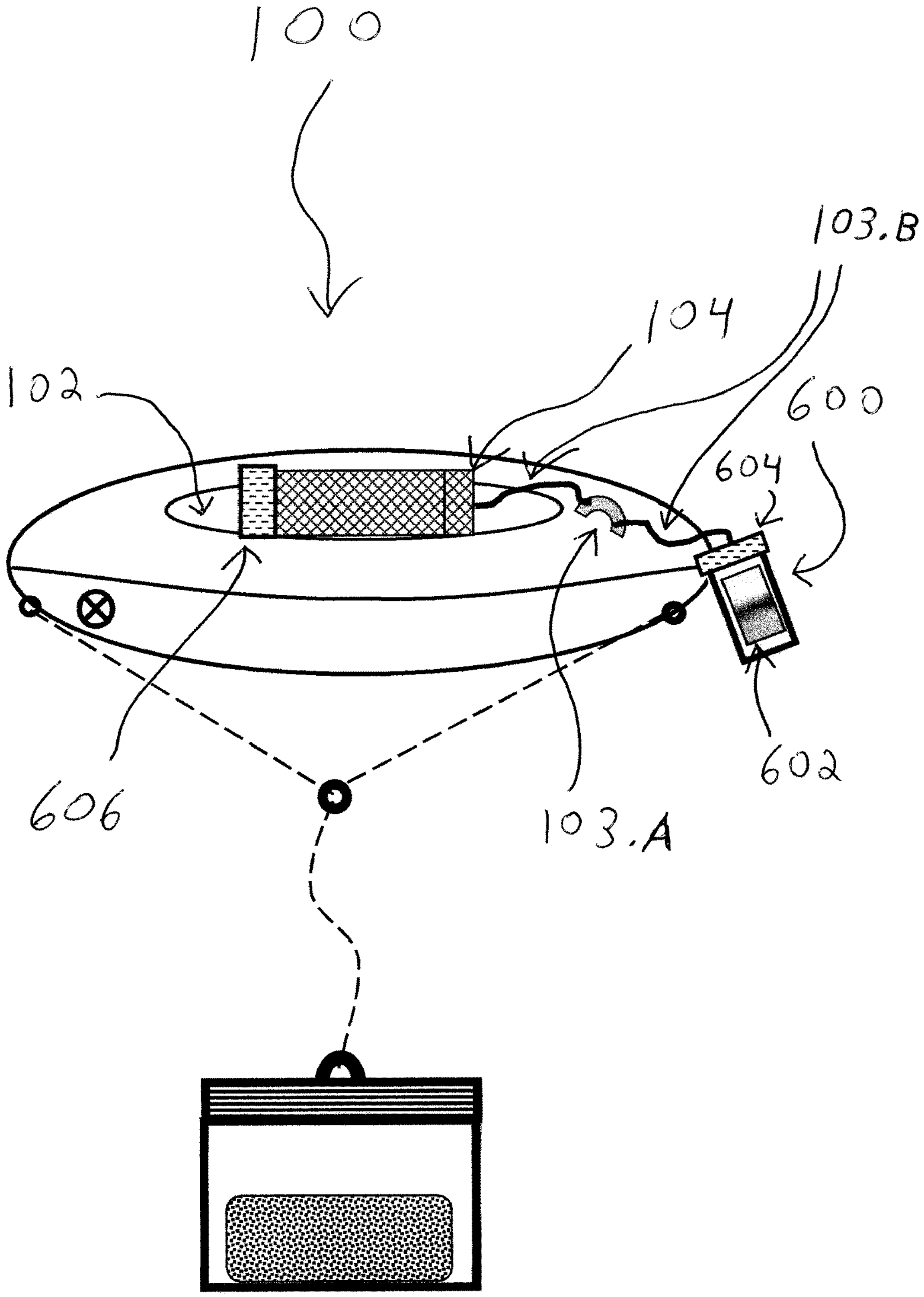
FIG. 19 shows a schematic view of a flotation device configured to include at least one connection point configured to secure at least one audio device, at least one portable waterproof communication device compartment, and/or an enclosure, according to an example embodiment of the present disclosure.

FIG. 19 discloses another example of the flotation device 100, according to an embodiment of the present disclosure. The flotation device 100 is similar to the flotation device 100 as described in FIG. 1 and may include, but not show, any one or more of the other features as disclosed in other flotation devices described herein. In this example embodiment, the at least one securing device 103A is configured to provide a connection point for at least one of the audio device 104 and/or a portable waterproof communication device compartment 600, which is configured to contain at least one communication device 602. The portable waterproof communication device compartment 602 is configured to be connected to the securing device 103A via a connecting device 103B, which may be at least one of a clip, a hook, a grommet and/or ring, a strap, or a stretchable material such as elastic or rubber configured to be attached to or connect to the securing device 103A. The portable waterproof communication device compartment 602 may be configured to float in water by itself by including its own flotation device and/or material 604 (e.g., a flotation material). The audio device 104 may also be configured to be connected to the securing device 103A via the connecting device 103B, which may be at least one of a clip, a hook, a grommet and/or ring, a strap, or a stretchable material such as elastic or rubber configured to be attached to or connect to the securing device 103A. The audio device 104 may be configured to float in water by itself by including its own flotation device and/or material 606 (e.g., a flotation material).

It should be appreciated that one or more features and/or embodiments described in FIGS. 1-17 may be combined with one or more other features and/or embodiments described in FIGS. 1-17. Additionally, while the figures show example embodiments, they do not limit the scope of the disclosure in any way to certain features, materials, sizes, shapes, dimensions, colors, and or thickness that are described herein.

What is claimed is:

1. A flotation apparatus for supporting a portable audio device on water, the apparatus comprising:
- an inflatable flotation device including:
  - at least one compartment configured to securely contain at least one audio device, wherein the at least one compartment is configured to enable the at least one audio device to be inserted and removed from the at least one compartment,
  - at least one cover configured to provide a closure for the at least one compartment, and
  - at least one second compartment configured to securely contain at least one communication device that is wirelessly coupled to the at least one audio device, wherein the at least one second compartment is waterproof and configured to be at least partially submerged in water to provide heat sinking;
- at least one air valve configured for inflating and deflating the inflatable flotation device; and
- at least one connection point, wherein the at least one connection point is configured to connect to at least one line that is configured to be connected to at least one anchor,
- wherein the inflatable flotation device is configured to float on a surface of a body of water and securely contain the at least one audio device in the at least one compartment.

2. The flotation apparatus of claim 1, further comprising at least one beverage compartment configured to contain at least one beverage.

3. The flotation apparatus of claim 1, further comprising at least one audio tunnel extending from an inside of the at least one compartment to an exterior of the inflatable flotation device.

4. The flotation apparatus of claim 1, wherein the at least one cover is configured to allow audio to be heard through the at least one cover.

5. A flotation apparatus for supporting a portable audio device on water, the apparatus comprising:
an inflatable flotation device including:
at least one compartment configured to securely contain at least one audio device, wherein the at least one compartment is configured to enable the at least one audio device to be inserted and removed from the at least one compartment,
at least one cover configured to provide a closure for the at least one compartment, and
at least one second compartment configured to securely contain at least one communication device that is wirelessly coupled to the at least one audio device, wherein
the at least one second compartment is waterproof and configured to be at least partially submerged in water to provide heat sinking;
at least one air valve configured for inflating and deflating the inflatable flotation device; and
at least one connection point, wherein the at least one connection point is configured to connect to at least one line that is configured to be connected to at least one anchor,
wherein the inflatable flotation device is configured to float on a surface of a body of water and securely contain the at least one audio device in the at least one compartment, and
wherein the inflatable flotation device is configured to be connected to the at least one anchor.

6. The flotation apparatus of claim 5, further comprising at least one beverage compartment configured to contain at least one beverage.

7. The flotation apparatus of claim 5, further comprising at least one audio tunnel extending from an inside of the at least one compartment to an exterior of the inflatable flotation device.

8. The flotation apparatus of claim 5, wherein the at least one cover is configured to allow audio to be heard through the at least one cover.

9. The flotation apparatus of claim 5, wherein the inflatable flotation device is configured to support at least one person when the inflatable flotation device is floating on the surface of the body of water while holding the at least one audio device within the at least one compartment.

10. The flotation apparatus of claim 5, further comprising at least one second connection point configured to secure a portable waterproof enclosure for another communication device.

11. The flotation apparatus of claim 5, wherein the at least one compartment includes a floor or a base having a drain configured to remove water from the at least one compartment.

12. The flotation apparatus of claim 5, further comprising the at least one anchor, wherein the at least one anchor is configured to be filled with a material that increases a weight of the at least one anchor.

13. The flotation apparatus of claim 5, further comprising the at least one audio device.

14. A flotation apparatus for supporting a portable audio device on water, the apparatus comprising:
an inflatable flotation device including:
at least one compartment configured to securely contain at least one audio device, wherein the at least one compartment is configured to enable the at least one audio device to be inserted and removed from the at least one compartment,
at least one cover configured to provide a closure for the at least one compartment, and
at least one second compartment configured to securely contain at least one communication device that is wirelessly coupled to the at least one audio device, wherein the at least one second compartment is waterproof and configured to be at least partially submerged in water to provide heat sinking;
at least one air valve configured for inflating and deflating the inflatable flotation device;
at least one anchor configured to be connected to at least one line; and
at least one connection point, wherein the at least one connection point is configured to connect to the at least one line that is configured to be connected to the at least one anchor,
wherein the inflatable flotation device and the at least one anchor are configured to be connected together via the at least one line, and
wherein the inflatable flotation device is configured to float on a surface of a body of water and securely contain the at least one audio device in the at least one compartment.

15. The flotation apparatus of claim 14, further comprising at least one water resistant or waterproof compartment.

16. The flotation apparatus of claim 14, further comprising at least one beverage compartment configured to contain at least one beverage.

17. The flotation apparatus of claim 14, further comprising at least one audio tunnel extending from an inside of the at least one compartment to an exterior of the inflatable flotation device.

18. The flotation apparatus of claim 14, wherein the at least one compartment is configured to drain water.

19. The flotation apparatus of claim 14, wherein the inflatable flotation device is configured to support at least one person when the inflatable flotation device is floating on the surface of the body of water while holding the at least one audio device within the at least one compartment.

20. The flotation apparatus of claim 14, further comprising at least one second connection point configured to secure a portable waterproof enclosure for another communication device.

21. The flotation apparatus of claim 14, further comprising the at least one audio device.

22. The flotation apparatus of claim 14, wherein the at least one anchor is configured to be filled with a material that increases a weight of the at least one anchor.

23. The flotation apparatus of claim 14, wherein the at least one cover is configured to allow audio to be heard through the at least one cover.

24. A flotation apparatus for supporting a portable audio device on water, the apparatus comprising:
an inflatable flotation device including:
at least one compartment configured to securely contain at least one audio device, wherein the at least one compartment is configured to enable the at least one audio device to be inserted and removed from the at least one compartment,
at least one cover configured to provide a closure for the at least one compartment, and at least one second compartment configured to securely contain at least one communication device that is wirelessly coupled to the at least one audio device, wherein the at least one second compartment is waterproof and configured to be at least partially submerged in water to provide heat sinking;

at least one air valve configured for inflating and deflating the inflatable flotation device;

at least one anchor configured to be connected to at least one line; and at least one connection point, wherein the at least one connection point is configured to connect to the at least one line that is configured to be connected to the at least one anchor, wherein the inflatable flotation device and the at least one anchor are configured to be connected together via the at least one line, wherein the inflatable flotation device is configured to float on a surface of a body of water and securely contain the at least one audio device in the at least one compartment, and wherein the at least one anchor is configured to be filled with a material that increases a weight of the at least one anchor.

25. The flotation apparatus of claim 24, further comprising at least one beverage compartment configured to contain at least one beverage.

26. The flotation apparatus of claim 24, wherein the at least one compartment is configured to be waterproof.

27. The flotation apparatus of claim 24, wherein the at least one cover is configured to enable audio signals to pass through at an audible level.

28. The flotation apparatus of claim 24, wherein the inflatable flotation device is configured to support at least one person when the inflatable flotation device is floating on the surface of the body of water.

29. The flotation apparatus of claim 24, further comprising at least one second connection point configured to secure the at least one second compartment.

30. The flotation apparatus of claim 24, further comprising the at least one audio device.

31. The flotation apparatus of claim 24, wherein the at least one compartment includes a base or a floor that is configured to drain water.

32. A flotation apparatus for supporting a portable audio device on water, the apparatus comprising:

an inflatable flotation device including:

at least one compartment configured to securely contain at least one audio device, wherein the at least one compartment is configured to enable the at least one audio device to be inserted and removed from the at least one compartment, at least one cover configured to provide a closure for the at least one compartment, and at least one second compartment configured to securely contain at least one communication device that is wirelessly coupled to the at least one audio device, wherein the at least one second compartment is waterproof and configured to be at least partially submerged in water to provide heat sinking;

at least one beverage compartment configured to contain at least one beverage;

at least one air valve configured for inflating and deflating the inflatable flotation device; and at least one connection point, wherein the at least one connection point is configured to connect to at least one line that is configured to be connected to at least one anchor, wherein the inflatable flotation device and the at least one anchor are configured to be connected together via the at least one line, and wherein the inflatable flotation device is configured to float on a surface of a body of water and securely contain the at least one audio device in the at least one compartment.

33. The flotation apparatus of claim 32, further comprising at least one second cover for the at least one second compartment, wherein the at least one second cover is configured to enable audio signals to pass through at an audible level.

34. The flotation apparatus of claim 32, further comprising at least one second connection point configured for securing the at least one second compartment.

35. The flotation apparatus of claim 32, wherein the inflatable flotation device is configured to support at least one person when the inflatable flotation device is floating on the surface of the body of water while holding the at least one audio device within the at least one compartment.

36. The flotation apparatus of claim 32, wherein the at least one compartment includes a base or a floor that is configured to drain water.

37. The flotation apparatus of claim 32, further comprising the at least one anchor, wherein the at least one anchor is configured to be filled with a material that increases a weight of the at least one anchor.

38. The flotation apparatus of claim 32, further comprising the at least one audio device.

39. A flotation apparatus for supporting a portable audio device on water, the apparatus comprising:

an inflatable flotation device including:

at least one compartment configured to securely contain at least one audio device, wherein the at least one compartment is configured to enable the at least one audio device to be inserted and removed from the at least one compartment, at least one cover configured to provide a closure for the at least one compartment, and at least one waterproof compartment configured to securely contain at least one communication device, wherein the at least one waterproof compartment is configured to enable the at least one communication device to be inserted and removed from the at least one waterproof compartment, and wherein the at least one waterproof compartment is configured to be at least partially submerged in water to provide heat sinking;

at least one beverage compartment configured to contain at least one beverage;

at least one air valve configured for inflating and deflating the inflatable flotation device;

at least one anchor configured to be connected to at least one line; and at least one connection point, wherein the at least one connection point is configured to connect to the at least one line that is configured to be connected to the at least one anchor, wherein the inflatable flotation device and the at least one anchor are configured to be connected together via the at least one line, wherein the at least one anchor is configured to be filled with a material that increases a weight of the at least one anchor, and wherein the inflatable flotation device is configured to float on a surface of a body of water and securely contain the at least one audio device in the at least one compartment.

40. The flotation apparatus of claim 39, wherein the at least one compartment and/or the at least one waterproof compartment includes a base or a floor that is configured to drain water.

41. The flotation apparatus of claim 39, wherein the inflatable flotation device is configured to support at least one person when the inflatable flotation device is floating on the surface of the body of water while holding the at least one audio device within the at least one compartment and the at least one communication device within the at least one waterproof compartment.

42. A flotation system comprising:

at least one portable audio device that includes at least one of a radio or a wireless speaker; and an inflatable flotation device including:

at least one compartment configured to securely contain the at least one portable audio device, wherein the at least one compartment is configured to enable the at least one portable audio device to be inserted and removed from the at least one compartment, at least one cover configured to provide a closure for the at least one compartment, and at least one second compartment configured to securely contain at least one communication device that is wirelessly coupled to the at least one portable audio device, wherein the at least one second compartment is waterproof and configured to be at least partially submerged in water to provide heat sinking, and at least one air valve configured for allowing air to be inserted into and removed from the inflatable flotation device for inflating and deflating the inflatable flotation device, wherein the inflatable flotation device is configured to float on a surface of a body of water and securely contain the at least one portable audio device in the at least one compartment.

43. The flotation system of claim 42, further comprising a storage compartment configured to securely contain the inflatable flotation device within the storage compartment when the inflatable flotation device is deflated.

44. The flotation system of claim 42, wherein the inflatable flotation device further includes at least one audio tunnel extending from an inside of the at least one compartment to an exterior of the inflatable flotation device.

45. The flotation system of claim 42, wherein the inflatable flotation device further includes:

at least one line; and at least one anchor configured to be connected to the at least one line, wherein the anchor is configured to be filled with at least one of:

a material that increases a weight of the at least one anchor, or the inflatable flotation device when the inflatable flotation device is deflated, wherein the inflatable flotation device and the at least one anchor are configured to be connected to each other via the at least one line, wherein the at least one line is configured to be adjustable in length and secured at a fixed length position after adjustment, and wherein the at least one anchor is configured to sit at a bottom of the body of water and the inflatable flotation device is configured to float on the surface of the body of water and securely support the at least one portable audio device on the surface of the body of water.

46. A flotation system comprising:

at least one portable audio device that includes at least one of a radio or a wireless speaker; and at least one inflatable flotation device including:

at least one compartment configured to securely contain the at least one portable audio device, wherein the at least one compartment is configured to enable the at least one portable audio device to be inserted and removed from the at least one compartment, at least one cover configured to provide a closure for the at least one compartment, and at least one second compartment configured to securely contain at least one communication device that is wirelessly coupled to the at least one portable audio device, wherein the at least one second compartment is waterproof and configured to be at least partially submerged in water to provide heat sinking, at least one air valve configured for allowing air to be inserted into and removed from the at least one inflatable flotation device for inflating and deflating the at least one inflatable flotation device, wherein the at least one inflatable flotation device is configured to float on a surface of a body of water and securely contain the at least one portable audio device in the at least one compartment, and wherein the at least one portable audio device is configured to include a device compartment configured to securely contain the at least one inflatable flotation device when the at least one inflatable flotation device is deflated.

47. The flotation system of claim 46, wherein the at least one inflatable flotation device further includes at least one audio tunnel extending from an inside of the at least one compartment to an exterior of the at least one inflatable flotation device.

48. A portable audio apparatus comprising:

a portable audio device configured to float in water, wherein the portable audio device includes at least one compartment configured to securely contain at least one communication device and configured to be at least partially submerged in water to provide heat sinking and wherein the portable audio device and the at least one communication device are configured to be in communication with each other via a wired or wireless connection;

at least one buoyant material configured to be integrated with the portable audio device;

at least one line; and at least one anchor configured to be connected to the at least one line, wherein the at least one anchor is configured to be filled with at least one of:

a material that increases a weight of the at least one anchor, or at least a portion of the portable audio device when the at least one anchor is not filled with a material that increases the weight of the at least one anchor, wherein the portable audio device and the at least one anchor are configured to be connected together with the at least one line, and wherein the at least one line is configured to be adjustable in length and secured at a fixed length position after adjustment, and wherein the at least one anchor is configured to sit at a bottom of a water body and the portable audio device is configured to float at a stationary position at a surface of the water body and securely support the at least one communication device near the surface of the water body when the at least one anchor and the portable audio device are connected together with the at least one line.

* * * * *